(12) United States Patent
Ridgeway et al.

(10) Patent No.: US 12,292,352 B2
(45) Date of Patent: May 6, 2025

(54) OPTICAL IMAGING PERFORMANCE TEST SYSTEM AND METHOD

(71) Applicant: Agilent Technologies, Inc., Santa Clara, CA (US)

(72) Inventors: William K Ridgeway, Santa Clara, CA (US); Alan Dyke, Santa Clara, CA (US); Pengyuan Chen, Santa Clara, CA (US); Rebecca Di Ricco Kurzava, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 254 days.

(21) Appl. No.: 17/632,595

(22) PCT Filed: Aug. 7, 2020

(86) PCT No.: PCT/US2020/045525
§ 371 (c)(1),
(2) Date: Feb. 3, 2022

(87) PCT Pub. No.: WO2021/026515
PCT Pub. Date: Feb. 11, 2021

(65) Prior Publication Data
US 2022/0276125 A1    Sep. 1, 2022

Related U.S. Application Data

(60) Provisional application No. 62/884,116, filed on Aug. 7, 2019.

(51) Int. Cl.
*G01M 11/02*     (2006.01)
*G02B 27/62*     (2006.01)

(52) U.S. Cl.
CPC ......... *G01M 11/0264* (2013.01); *G02B 27/62* (2013.01)

(58) Field of Classification Search
CPC .......... G01M 11/0264; G01M 11/0292; G02B 27/62
(Continued)

(56) References Cited

U.S. PATENT DOCUMENTS 5,629,766 A * 5/1997 Kaplan ............. G01M 11/0292
356/124.5
6,285,799 B1 * 9/2001 Dance ...................... G06T 5/73
382/260
(Continued)

FOREIGN PATENT DOCUMENTS

CN    101303269 A    11/2008
CN    103905714 A    7/2014
(Continued)

OTHER PUBLICATIONS

PCT International Search Report mailed Oct. 30, 2022 for application PCT/US2020/045525; 12 pages.
(Continued)

*Primary Examiner* — Isiaka O Akanbi

(57) ABSTRACT

For testing the imaging performance of an optical system, a test target is positioned at an object plane of the optical system, and illuminated to generate an image beam. One or more images of the test target are acquired from the image beam. From the imaging data acquired, Edge Spread Functions at a plurality of locations within the test target are calculated. A model of Point Spread Functions is constructed from the Edge Spread Functions. Based on the Point Spread Functions, a plurality of imaging performance values corresponding to the plurality of locations are calculated. The imaging performance values are based on Ensquared Energy, Encircled Energy, or Strehl ratio.

17 Claims, 17 Drawing Sheets

(58) Field of Classification Search
USPC .................................. 356/124, 124.5, 239
See application file for complete search history.

(56) References Cited

U.S. PATENT DOCUMENTS

| | | | |
|---|---|---|---|
| 8,318,094 B1* | 11/2012 | Bayandorian | G01N 35/0099 422/62 |
| 9,007,490 B1* | 4/2015 | Yuan | G06F 3/005 348/241 |
| 9,030,594 B1 | 5/2015 | Bhakta et al. | |
| 2007/0165131 A1* | 7/2007 | Ish-Shalom | H04N 23/54 348/E5.045 |
| 2008/0212830 A1* | 9/2008 | Minarik | G02B 7/36 382/103 |
| 2008/0253675 A1* | 10/2008 | Chou | G06T 7/13 382/255 |
| 2009/0147111 A1* | 6/2009 | Litvinov | G06T 5/20 348/E9.002 |
| 2010/0080487 A1* | 4/2010 | Yitzhaky | G06T 5/20 382/266 |
| 2011/0044554 A1* | 2/2011 | Tian | G06T 5/73 358/463 |
| 2013/0016275 A1* | 1/2013 | Hokoi | H04N 25/611 348/E7.001 |
| 2014/0104618 A1* | 4/2014 | Potsaid | G02B 27/0068 356/497 |
| 2014/0233087 A1* | 8/2014 | Knutsson | G06T 5/10 359/291 |
| 2015/0192510 A1* | 7/2015 | Piestun | G01N 15/1429 702/152 |
| 2016/0003740 A1* | 1/2016 | Tao | G01N 21/6428 250/201.3 |
| 2016/0084773 A1* | 3/2016 | Grossman | G01N 21/8806 356/237.2 |
| 2020/0188166 A1* | 6/2020 | Buck | A61F 9/008 |
| 2020/0293808 A1* | 9/2020 | Miginnis | G06V 10/25 |

FOREIGN PATENT DOCUMENTS

| | | |
|---|---|---|
| CN | 103927740 A | 7/2014 |
| CN | 104833480 A | 8/2015 |
| CN | 104937475 A | 9/2015 |
| CN | 105719298 A | 6/2016 |
| CN | 109708842 A | 5/2019 |
| EP | 0848809 A1 | 6/1998 |
| EP | 0848809 B1 * | 6/2003 ........ G01M 11/0292 |
| GB | 2482022 A | 1/2012 |
| JP | 2007212620 A | 8/2007 |
| JP | 2010230745 A | 10/2010 |
| JP | 2011045078 A | 3/2011 |
| JP | 2011159178 A | 8/2011 |
| JP | 2014521117 A | 8/2014 |
| JP | 2017532612 A | 11/2017 |
| WO | 03056392 A1 | 7/2003 |
| WO | 2008050320 A2 | 5/2008 |
| WO | 2014171304 A1 | 10/2014 |
| WO | 2014174438 A1 | 10/2014 |

OTHER PUBLICATIONS

Lou, Ying "Study On Modern Measuring Methods For Lens Optical Parameters" Infrared and Laser Engineering vol. 37 supplement; Apr. 2008; 4 pages.
Chinese Office Action and Search Report dated Jun. 26, 2023 for application No. 202080055029.3; 13 pages.
Marchand, E. W. et al., "Derivation Of The Point Spread Function From The Line Spread Function," Journal Of The Optical Society Of America, vol. 54, No. 7, Jul. 1964, pp. 915-919; 5 pages.
Nugent, Paul W. et al., "Measuring The Modulation Transfer Function Of Imaging Spectrometers At Infinite Focus With Roof-Line Images," Proc. of SPIE vol. 6661, Sep. 2007, 9 pages.
Li, Hong et al., "Biomedical Optics: Principles and Imaging," First Edition was originally published in English in 2007 This translation is published by arrangement with John Wiley & Sons, Inc, Jan. 31, 2017, pp. 9-14; 8 pages.
Liu, Li et al., "Principles and Applications of Comprehensive Aperture Imaging," Jul. 31, 2013, pp. 46-51; 8 pages.
Padgett and Kotre, "Development and Application of Programs to Measure Modulation Transfer Function, Noise Power Spectrum and Detective Quantum Efficiency," Radiation Protection Dosimetry, vol. 117, No. 1-3, pp. 283-287, (2005); 5 pages.
Samei, Flynn, and Reimann, "A Method for Measuring the Presampled MTF of Digital Radiographic Systems Using an Edge Test Device" Medical Physics, vol. 25, No. 1, pp. 102-113, (1998); 12 pages.
Judy, "The Line Spread Function and Modulation Transfer Function of a Computer Tomographic Scanner," Medical Physics, vol. 3, No. 4, pp. 233-236, (1975); 4 pages.
Fujita et al. "A Simple Method for Determining the Modulation Transfer Function in Digital Radiography," IEEE transactions on medical imaging, vol. 11, No. 1, (1992); 6 pages.
Du et al. "A Quality Assurance Phantom for the Performance Evaluation of Volumetric Micro-CT Systems," Physics Medicine Biology, vol. 52, pp 7087-7108, (2007); 23 pages.
Chinese Office Action and Search report dated Mar. 30, 2024 for application No. 202080055029.3 with English translation; 22 pages.

* cited by examiner

Tilted squares for simultaneous ESF determination in vertical & horizontal directions

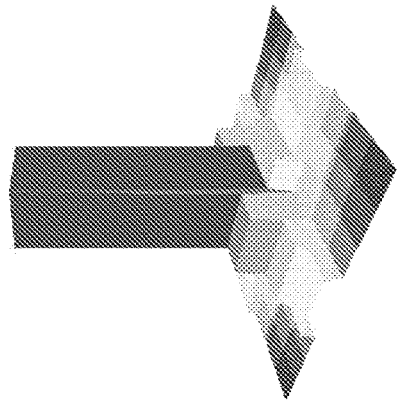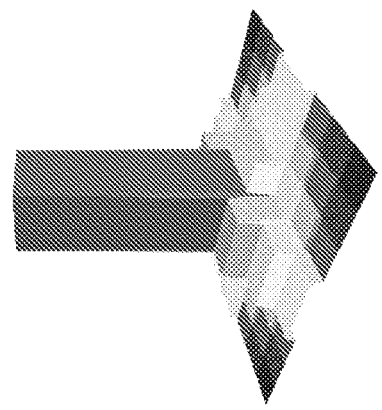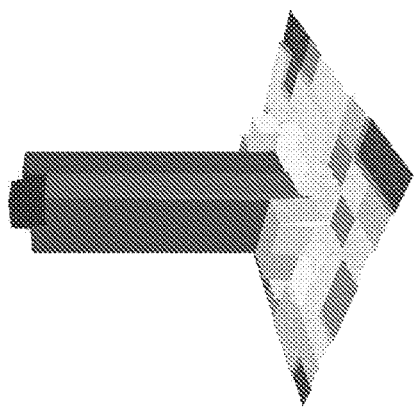
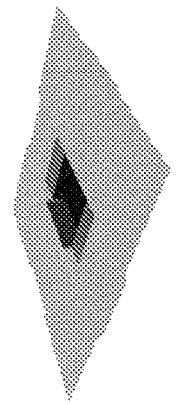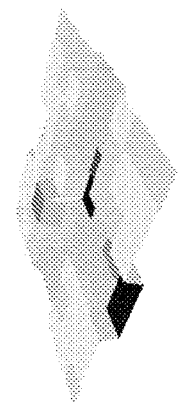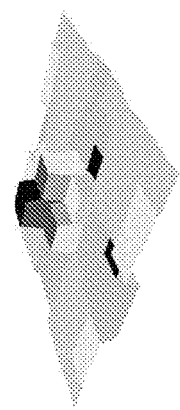
FIG. 4A True PSF EE: 0.594
FIG. 4B LSF x LSF approximation EE: 0.540
FIG. 4C PSF model fit to ESF data EE: 0.549
FIG. 4D Difference between True & LSF x LSF
FIG. 4E Difference between True & ESF fit model
FIG. 4F Difference between LSF & ESF fit model

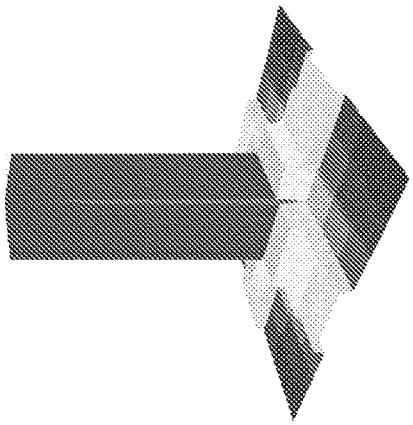
FIG. 5A — True PSF EE: 0.693
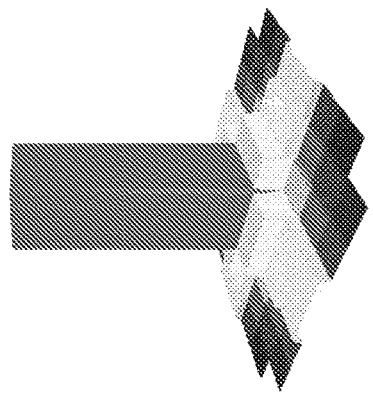
FIG. 5B — LSF x LSF approximation EE: 0.631
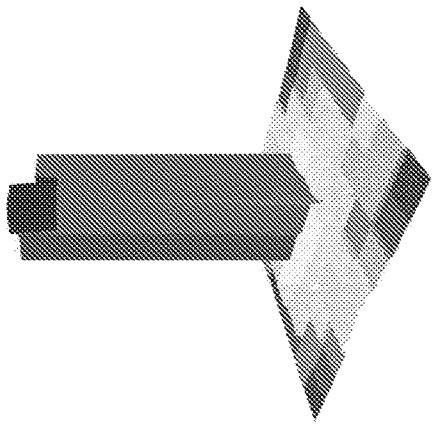
FIG. 5C — PSF model fit to ESF data EE: 0.651
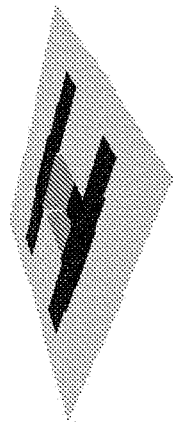
FIG. 5D — Difference between True & LSF x LSF
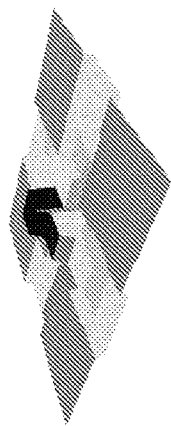
FIG. 5E — Difference between True & ESF fit model
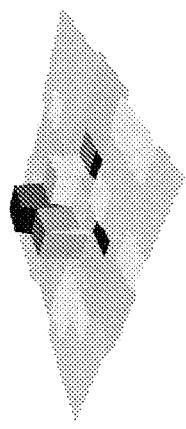
FIG. 5F — Difference between LSF & ESF fit model True PSF
EE: 0.349

LSF x LSF approximation
EE: 0.298

PSF model fit to ESF data
EE: 0.301

Difference between
True & LSF x LSF

Difference between
True & ESF fit model

Difference between
LSF & ESF fit model

OPTICAL IMAGING PERFORMANCE TEST SYSTEM AND METHOD

RELATED APPLICATIONS

This application is the national stage under 35 U.S.C. 371 of International Application No. PCT/US2020/045525, filed Aug. 7, 2020; which claims the benefit under 35 U.S.C. § 119 (e) of U.S. Provisional Patent Application Ser. No. 62/884,116, filed Aug. 7, 2019, titled "OPTICAL IMAGING PERFORMANCE TEST SYSTEM AND METHOD;" the entire contents of each of which are incorporated by reference herein.

TECHNICAL FIELD

The present invention generally relates to the testing of the imaging performance of an optical imaging system, such as may be utilized in microscopy to acquire imaging data from a sample under analysis.

BACKGROUND

In an optical imaging system, including an automated, high-throughput optical imaging system utilized in microscopy, a key metric of the quality of the imaging data obtained is the sharpness of the images obtained. Many applications of microscopic imaging (for example, in DNA sequencing) depend on the ability to produce uniformly sharp images across the field of view of one or more channels or cameras, despite imperfect focus and tilt of the specimen. The optical alignment of the cameras and other optical components of the optical imaging system to each other and to the specimen being imaged can contribute significantly to the image sharpness and thus the quality of imaging data produced. Accordingly, it is desirable to be able to test and evaluate the imaging performance (i.e., quality) of an optical imaging system. For example, it is useful to determine whether the optical imaging system meets or exceeds some predetermined level of minimum quality deemed to be acceptable for a given application of the optical imaging system. For expedient manufacturing and the calculation of manufacturing performance metrics, it is further useful to describe the entire imaging performance using a single precise number.

An image acquired by an optical imaging system may be characterized as a mixture of the real specimen (or object) [S(x, y)] and an instrument response function, which in microscopy is termed a Point Spread Function [PSF(x, y)]. Mathematically, the image I(x, y) is the sum of the convolution of the specimen and the PSF and the noise at each pixel, N(x, y), as follows:

$$I(x,y) = PSF(x,y) * S(x,y) + N(x,y) \quad (1)$$

An evaluation of imaging performance may involve acquiring an image of a specimen (which may be a test target, i.e., an object provided for the purpose of testing), using the imaging data to measure and quantify the PSF, and comparing the results against a predetermined minimum pass criterion.

It is desirable to describe the quality of the PSF using a single scalar number. Several metrics are commonly used, such as full width at half maximum (FWHM) or Strehl ratio of the real-space PSF, wavefront error or modulation transfer function (MTF) contrast at a single frequency, and the real-space quantity Encircled Energy or Ensquared Energy. The accuracy and precision of the estimate for the measurement of each quantity is strongly linked to the experimental methods used to calculate them. The advantages and disadvantages of each pertain to the accuracy with which they are estimated, the ease of interpretation, and the ability to catch both poor image resolution and poor image signal to noise ratios (SNRs).

The classical formulation of Equation (1) above does not reflect the fact that the PSF changes over the field of the image, which would be the equivalent of saying that an image could be sharp (high quality) in the middle and blurry (poor quality) at the edges. An optical system that is near to diffraction limited and optimized for detection of weak sources will have a compact PSF containing density in an approximately 5×5 pixel area, in contrast to a typically much wider image, such as 4096×3000 pixel images. The small PSF can vary substantially across the image, necessitating multiple independent measurements of the PSF across the field of view. In addition to changing over field coordinates (x, y), the PSF is strongly affected by the focus of the image in the z direction, and high performance, high numerical aperture (NA) objectives experience a rapid degradation of PSF performance with defocus, which is to say they have a shallow depth of field. Diffraction effects place an upper limit on the depth of field, but poorly corrected or poorly aligned systems will experience even shallower depth of field. The practical limitations of this are significant, as a system of low optical quality might need to be re-focused several times in order to get a sharp image at every point of the field, leading to poor throughput of the system and potential photo-degradation of the sample.

Downstream processing of images by image analysis software produces results that can be strongly influenced by image sharpness. Blurry images of high-contrast punctate objects experience a fundamental degradation of signal to noise ratios and reduction of resolution. For example, blurry images of DNA clusters reduce the ability to perform accurate photometry of nucleotide abundance, reduce the number of small distinct clusters that can be observed and introduce crosstalk between neighboring clusters.

Image processing algorithms can partially mitigate blurry images by performing any of a number of explicit steps using well known deconvolution methods, or implicit steps such as selective filtering of data. Such approaches incur computational expenses if required to estimate the degree of PSF degradation for each image or batch of images, and the estimate of PSF degradation itself can add noise. Faster approaches assume that PSFs are of a constant sharpness, but any difference between the actual PSF and the assumed PSF can degrade the quality of the image processing results. PSF homogeneity across input images therefore influences the effectiveness of image processing algorithms.

Existing methods of optical alignment are labor intensive and struggle to get quick feedback that describes the entirety of the optical system performance, e.g. in the case of wavefront measurements they might accurately and quickly describe a single point in the field of view, and neglect to inform the operator how their actions affect distant points in the field. Manufacturing labor costs associated with optical alignment can be lowered with the use of fast predictive feedback to direct operators. Thus, a fast global analysis of system performance, providing feedback with latency on the order of 0-5 seconds, would be beneficial.

Furthermore, analysis of manufacturing yields (for example using CpK process capability statistics) requires the quality of each unit to be estimated as a continuous variable, ideally so as to look at a single such variable to describe the build of the entire unit.

Therefore, an ongoing need exists for improved approaches for imaging performance testing of optical imaging systems.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a method for testing imaging performance of an optical system includes: positioning a test target at an object plane of the optical system; operating the optical system to illuminate the test target and generate an image beam; operating a focusing stage of the optical system to acquire a plurality of images of the test target corresponding to a plurality values of defocus; calculating from each image a plurality of Edge Spread Functions at a plurality of locations within the test target; constructing a plurality of Point Spread Function models from the respective Edge Spread Functions; and based on the Point Spread Functions, calculating a plurality of imaging performance values corresponding to the plurality of locations within the imaging volume defined by the image plane extruded through the range of defocus positions, wherein the imaging performance values are based on at least one of the following metrics: Ensquared Energy; Encircled Energy; or Strehl ratio.

In an embodiment, illuminating the test target entails back illuminating the test target with a numerical aperture (NA) greater than or equal to the optical system under test.

In an embodiment, the method includes assessing and describing the distribution and mapping of imaging performance values over the imaging volume, or additionally includes calculating condensed summary scores based on such distributions and maps.

According to another embodiment, an optical imaging performance testing system includes: a target holder configured to hold a test target; a light source configured to illuminate the test target; an imaging device configured to acquire images of the test target; an objective positioned in an imaging light path between the test target and the imaging device, wherein a position of the objective is adjustable along the imaging light path; and a controller comprising an electronic processor and a memory, and configured to control or perform at least the following steps or functions of the method for testing imaging performance: calculating the plurality of Edge Spread Functions, constructing the Point Spread Function models, and calculating the plurality of imaging performance values.

In an embodiment, the optical imaging performance testing system includes a tube lens positioned in the imaging light path between the test target and the imaging device.

In an embodiment, the optical imaging performance testing system includes other or additional mechanical devices or components configured to allow the angular orientations and positions of the imaging device to be altered with respect to each other and to the objective.

In an embodiment, the controller is configured to control or perform the following steps or functions of the method for testing imaging performance assessing and describing the distribution and mapping of imaging performance values over the imaging volume, and calculating condensed summary scores based on such distributions and maps.

According to another embodiment, a non-transitory computer-readable medium includes instructions stored thereon, that when executed on a processor, control or perform at least the following steps or functions of the method for testing imaging performance: calculating the plurality of Edge Spread Functions, constructing the model of Point Spread Functions, and calculating the plurality of imaging performance values.

According to another embodiment, a system for testing imaging performance of an optical system includes the computer-readable storage medium.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIG. 4A is an example of a three-dimensional (3-D) model of a true, reasonably sharp Point Spread Function or PSF (a PSF with a true Ensquared Energy value of 0.594) produced by implementing the system and method disclosed herein, where intensity level is color-coded and different colors are represented by different levels of shading.

FIG. 4B is an example of a 3-D model of the same PSF related to FIG. 4A, derived from a Line Spread Function by Line Spread Function (LSF×LSF) approximation.

FIG. 4C is an example of a 3-D model of the same PSF related to FIG. 4A, where the PSF model is fit to Edge Spread Function (ESF) data.

FIG. 4D is a 3-D model showing the difference between the PSF model of FIG. 4A and the PSF model of FIG. 4B.

FIG. 4E is a 3-D model showing the difference between the PSF model of FIG. 4A and the PSF model of FIG. 4C.

FIG. 4F is a 3-D model showing the difference between the PSF model of FIG. 4B and the PSF model of FIG. 4C.

FIG. 5A is another example of a 3-D model of a true, relatively sharp PSF (having a true EE value of 0.693), similar to FIG. 4A.

FIG. 5B is an example of a 3-D model of the same PSF related to FIG. 5A, derived from an LSF×LSF approximation.

FIG. 5C is an example of a 3-D model of the same PSF related to FIG. 5A, where the PSF model is fit to Edge Spread Function (ESF) data.

FIG. 5D is a 3-D model showing the difference between the PSF model of FIG. 5A and the PSF model of FIG. 5B.

FIG. 5E is a 3-D model showing the difference between the PSF model of FIG. 5A and the PSF model of FIG. 5C.

FIG. 5F is a 3-D model showing the difference between the PSF model of FIG. 5B and the PSF model of FIG. 5C.

DETAILED DESCRIPTION

The present disclosure provides a system and method for testing the imaging performance of an optical imaging system.

Figure 1:
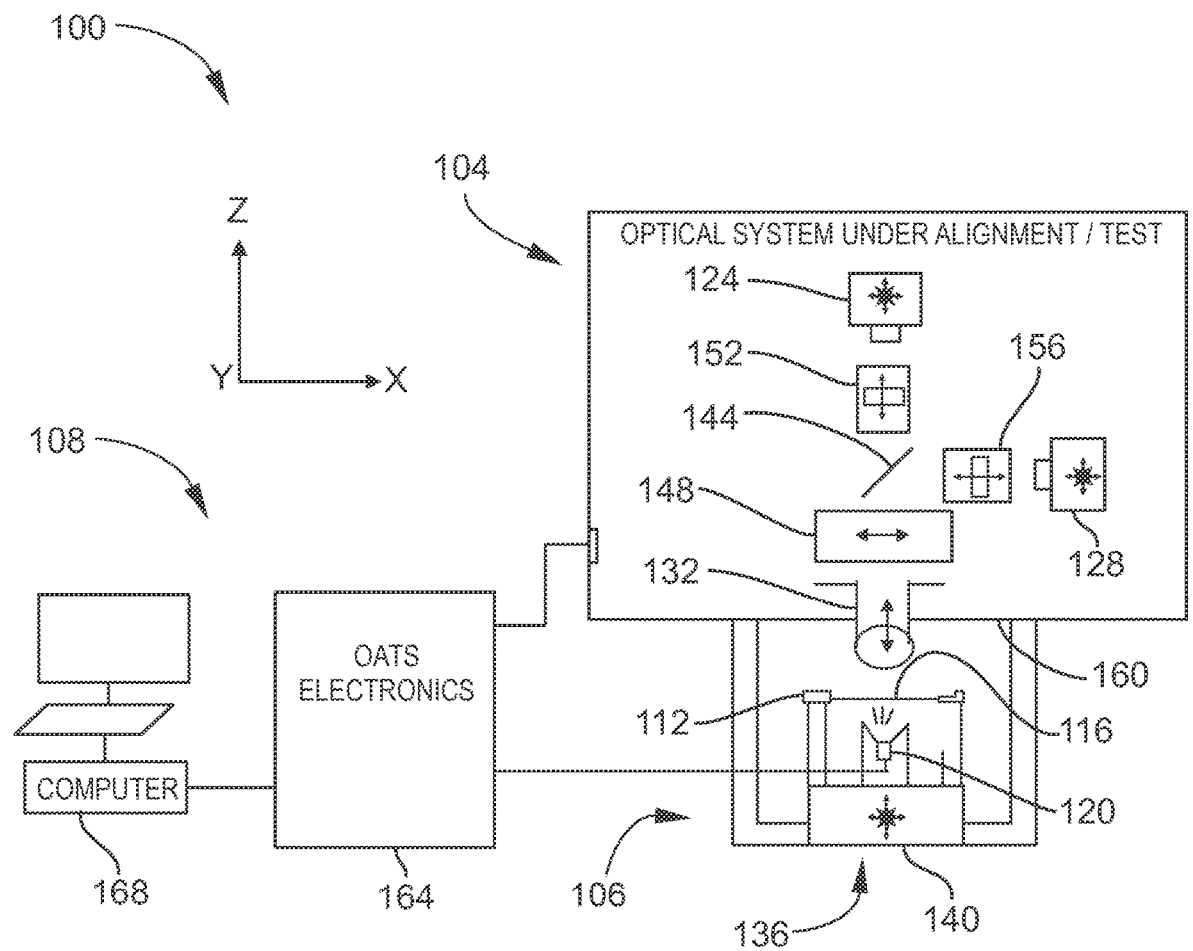
FIG. 1 is a schematic view of an example of an optical imaging performance testing system according to an embodiment of the present disclosure.

FIG. 1 is a schematic view of an example of an optical imaging performance testing system 100 according to an embodiment of the present disclosure. Generally, the structures and operations of various components of the optical imaging performance testing system 100 are known to persons skilled in the art, and accordingly are described only briefly herein as necessary for understanding the subject matter being disclosed. For illustrative purposes, FIG. 1 includes a Cartesian (X-Y-Z) frame of reference, the origin of which is arbitrarily located relative to the drawing figure.

Generally, the testing system 100 includes an optical system 104 under test, a test target stage assembly 106, and a system controller 108 in electrical communication (as needed, e.g., for transmitting power, data, measurement signals, control signals, etc.) with appropriate components of the optical system 104 and test target stage assembly 106. The optical system 104 may be an actual optical system to be tested, such as a product intended for commercial availability. Alternatively, the optical system 104 may be an ensemble of components supported by or mounted to the testing system 100 (e.g., on an optical bench of the testing system 100), and arranged to emulate an actual optical system (e.g., with the components positioned at determined distances and orientations relative to each other, and aligned with each other according to the intended configuration for operation).

Generally, the optical system 104 may be any system (or instrument, device, etc.) configured to acquire optical images of an object or sample under analysis. Such a sample may be biological (e.g., spores, fungi, molds, bacteria, viruses, biological cells or intracellular components such as for example nucleic acids (DNA, RNA, etc.), biologically derived particles such as skin cells, detritus, etc.) or non-biological. Typically, the optical system 104 is configured to acquire optical images with some range of magnification, and thus may be (or be part of) a type of microscope. The optical system 104 may or may not include a target holder 112 (e.g., a sample stage, or emulation of a sample stage) configured to hold a test target 116 (in the place of a sample that would be imaged in practice). In the event that the target holder 112 is separate, a mechanical datum 160 generally may be provided that permits attachment of the target holder 112 in a precisely located manner. A light source 120 is configured to illuminate the test target 116, and the light source 120 may or may not be part of the optical system 104 under test. One or more imaging devices 124 and 128 (e.g., a first imaging device 124 and a second imaging device 128 in the illustrated embodiment), such as cameras, are configured to capture images of the test target 116. The optical system 104 further includes other intermediate optics (optical components) as needed to define an illumination light path from the light source 120 to the target holder 112 and test target 116 (and through the test target 116 in the illustrated embodiment), and an imaging light path from the target holder 112 and test target 116 to the imaging device(s) 124 and 128, as appreciated by persons skilled in the art.

In particular, the optical system 104 typically includes an objective 132 positioned in the imaging light path between the target holder 112 and test target 116 and the imaging device(s) 124 and 128. The objective 132 is configured to magnify and focus the image to be captured by the imaging device(s) 124 and 128. In the optional case of infinity corrected microscope optics, the objective 132 performs this task in combination with tube lenses 152 and 156. In the illustrated embodiment, the objective 132 schematically depicts an objective assembly that includes an objective lens system mounted to an objective stage (or positioning device). The objective stage is configured to move (translate) the objective lens system along the Z-axis. Thus, the objective 132 is adjustable to focus or defocus at any desired depth (elevation) in the thickness of the test target 116, as needed for testing purposes. Because the objective 132 can focus at different elevations, the adjustability enables the optical system 104 to generate a "z-stack" of images, as appreciated by persons skilled in the art. Alternately, the objective 132 could be fixed in space and the specimen could be moved along the z direction in order to vary focus. Alternately, the objective 132 and specimen could be held in place and the tube lenses 152 and 156 could move relative to the imaging device(s) 124 and 128.

In the present example, the Z-axis is taken to be the optical axis (vertical from the perspective of FIG. 1) through the test target 116 on which the illumination light path and the imaging light path generally lie, and along which the objective 132 is adjustable for focusing and defocusing. Accordingly, the X-axis and Y-axis lie in the transverse plane orthogonal to the Z-axis. Hence, locations on the object plane in which the test target 116 is secured by the target holder 112 can be mapped using (X,Y) coordinates, and depth (focal position) can be mapped to the Z-coordinate.

In the illustrated embodiment, the optical system 104 has a top-read configuration in which the objective 132 is positioned above the target holder 112 and test target 116. In an alternative embodiment, the optical system 104 may have an inverted, or bottom-read, configuration in which the objective 132 is positioned below the target holder 112 and test target 116. The optical system 104 may be configured to capture transmitted or reflected light from the test target 116. In the illustrated embodiment, the optical system 104 is configured for trans-illumination, such that the illumination light path and the imaging light path are on opposite sides of the target holder 112 and test target 116. In an alternative embodiment, the optical system 104 may be configured such that the illumination light path and the imaging light path are on the same side of the target holder 112 and test target 116. For example, the objective 132 may be positioned in both the illumination light path and the imaging light path, such as in an epi-illumination or epi-fluorescence configuration as appreciated by persons skilled in the art.

The optical system 104 may include a target fixture or assembly 136 of which the target holder 112 is a part. The target holder 112 is mounted, attached, or otherwise mechanically referenced to a target stage (or positioning device) 140. A precise datum 160 may be utilized to mate the optical system 104 with the test target stage assembly 106. The target stage 140 may be configured for precise movement in a known manner via motorized or non-motorized (and automated and/or manual) actuation. The target stage 140 may be configured to translate along and/or rotate about one or more axes. For example, the target stage 140 may be configured for movement with five degrees of freedom (DOF), where the target stage 140 lacks freedom to move along the Z-axis (lacks focusing movement). In embodiments where illumination light is directed from below the target holder 112 (as illustrated), the target holder 112 may include a window or aperture 188 (FIG. 2) to enable passage of the illumination light, and the test target 116 may be mounted on such window or aperture 188.

The light source 120 may be any incoherent light source suitable for optical microscopy. By way of contrast, coherent sources will produce ESFs (Edge Spread Functions, described below) incompatible with the present analysis methods. Examples of an incoherent light source 120 include, but are not limited to, a broadband light source (e.g., halogen lamp, incandescent lamp, etc.), a light emitting diode (LED), or phosphor type material optically pumped by an LED, laser, incandescent lamp, etc. In some embodiments, the light source 120 may include a plurality of light-emitting units (e.g., LEDs) configured to emit light at different wavelengths, and a mechanism configured to enable selection of the light-emitting unit to be active at a given time. In the illustrated embodiment, the light source 120 is integrated with (and thus movable with) the target fixture 136 and positioned at a fixed distance from the target holder 112 and test target 116 along the Z-axis. In other embodiments, the light source 120 may be separate from the target fixture 136. In some embodiments, a condenser (not shown) may be positioned between the light source 120 and the target holder 112 and test target 116, for concentrating the illumination light from the light source 120 to enhance illumination of the test target 116, as appreciated by persons skilled in the art. The angle of illumination rays, specifically the numerical aperture (NA) of the illumination rays and the uniformity of radiant intensity, will influence the accuracy of the measured PSF. Ideal sources have a NA that exceeds the object NA of the optical system by a small margin and will exhibit uniform radiant intensity across said angles.

The imaging devices 124 and 128 are multi-pixel (or pixelated) imaging devices in which the sensors are pixel arrays (e.g., based on charge-coupled device (CCD) or an active-pixel sensor (APS) technology). Accordingly, the imaging devices 124 and 128 may be cameras of the type commonly utilized in microscopy and other imaging applications. In the illustrated embodiment, each of the imaging devices 124 and 128 schematically depicts an imaging device assembly that includes an imaging device unit (including the sensor, i.e. pixel array) mounted to an imaging device stage (or positioning device). Each imaging device stage may be configured for six DOF movement, i.e., both translation along and rotation about all three (X, Y, and Z) axes.

The imaging devices 124 and 128 may be positioned at any nominal angle and distance relative to each other. In the illustrated embodiment, the first imaging device 124 is positioned on-axis with the objective 132 (along the Z-axis), and the second imaging device 128 is positioned on an axis angled (ninety degrees in the illustrated embodiment) to the Z-axis (on the X-axis in the illustrated embodiment). The optical system 104 includes an image separation mirror 144 (e.g., a beam splitter or dichroic mirror) positioned on-axis between the objective 132 and the first imaging device 124. The image separation mirror 144 is configured to split the image beam propagating from the test target 116 into a first image beam portion that propagates along a first split imaging light path from the image separation mirror 144 (via transmission through the image separation mirror 144) to the first imaging device 124, and a second image beam portion that propagates along a second split imaging light path from the image separation mirror 144 (via reflection from the image separation mirror 144) to the second imaging device 128. The separating or splitting of the image beam into a first image beam portion and a second image beam portion may be on the basis of wavelength (i.e., color) within the electromagnetic spectral range of operation. For example, the first image beam portion may be a blue portion and the second image beam portion may be a red portion of the image beam.

The optical system 104 may include a filter assembly 148 (i.e., a wavelength selector) positioned in the imaging light path between the objective 132 and the imaging devices 124 and 128, or specifically between the objective 132 and the image separation mirror 144 in the illustrated embodiment. In the illustrated embodiment, the filter assembly 148 may represent a plurality of filters mounted to a filter stage configured to selectively switch different filters into and out from the imaging light path by linear translation (e.g., a filter slide) or rotation (e.g., a filter wheel), as depicted by a double-headed horizontal arrow in FIG. 1, thereby enabling the selection of wavelengths to be passed in the image beam portions respectively received by the imaging devices 124 and 128.

The filter assembly 148 may be utilized to implement multi-channel imaging, with each channel associated with a different wavelength (i.e., color) and each imaging device 124 and 128 utilized for one or more channels. As one non-exclusive example, the optical system 104 may be configured to acquire images in four channels (e.g., blue, green, red, and amber), with the first imaging device 124 designated for two of the channels (e.g., blue and green) and the second imaging device 128 designated for the other two channels (e.g., red and amber). The switching (positioning) of the filter assembly 148 may be coordinated with the operation of the imaging devices 124 and 128 and other components of the optical system 104 as needed to sequentially acquire images in the four channels. In one specific example, the four-channel configuration is useful in DNA sequencing in which different fluorescent labels have been associated with the different nucleobases (adenine, cytosine, guanine, thymine) in the sample under analysis.

Depending on the embodiment under test, the optical system 104 may further include one or more other types of optical components in the illumination light path and/or imaging light path. Examples include, but are not limited to, field lenses, relay lenses, beam expanders, beam collimators, apertures, slits, pinholes, confocal disks, etc. In the illustrated embodiment, the optical system 104 includes a first tube lens assembly 152 positioned in the first split imaging light path between the image separation mirror 144 and the first imaging device 124, and a second tube lens assembly 156 positioned in the second split imaging light path between the image separation mirror 144 and the second imaging device 128. In the illustrated embodiment, the first tube lens assembly 152 may represent a first tube lens mounted to a tube lens stage configured to adjust (translate) the relative positions of elements within the first tube lens along the axis of the first split imaging light path, as depicted by a double-headed vertical arrow in FIG. 1. The second tube lens assembly 156 may represent a second tube lens mounted to a tube lens stage configured to adjust (translate) the relative positions of elements within the second tube lens along the axis of the second split imaging light path, as depicted by a double-headed horizontal arrow in FIG. 1. The adjustable tube lenses may be utilized to realize infinity-corrected optics, as appreciated by persons skilled in the art.

The optical system 104 may include a suitable reference datum configured to serve as a reference datum for defining the positions of various adjustable components of the optical system 104, such as the target holder 112/test target 116, the objective 132, etc. In the illustrated embodiment, a fixed-position structure of the optical system 104, such as a surface of an enclosure 160 in which various components of the optical system 104 are housed, may serve as a reference datum.

Generally, the system controller (or controller) 108 is configured to control the operations of the various components of the optical system 104. This control includes monitoring and controlling (adjusting) the positions of the adjustable components of the optical system 104, and coordinating or synchronizing the operation of the adjustable components with other components such as the light source 120 and the imaging devices 124 and 128. The system controller 108 is further configured to process the imaging data outputted by the imaging devices 124 and 128 (e.g., data acquisition and signal analysis, including digitizing and recording/storing images, formatting images for display on a display device such as a computer screen, etc.). The system controller 108 is further configured to run performance testing of the optical system 104 according to the method disclosed herein, including executing any algorithms associated with the method. The system controller 108 is further configured to provide user interfaces as needed to facilitate operation of the optical system 104 and implementation of the performance testing. For all such functions, the system controller 108 is schematically depicted in FIG. 1 as including an electronics module 164 communicating with the optical system 104, and a computing device 168 communicating with the electronics module 164. The electronics module 164 and the computing device 168 will be understood to represent all hardware (microprocessor, memory, electrical circuitry, peripheral devices, etc.), firmware, and software components appropriate for carrying out all such functions, as appreciated by persons skilled in the art.

In an embodiment, the electronics module 164 may represent components dedicated to controlling the optical system 104 and running the performance testing, while the computing device 168 may represent a more general purpose computing device that is configurable or programmable to interface with the electronics module 164 to facilitate controlling the optical system 104 and running the performance testing. The system controller 108 (electronics module 164 and/or computing device 168) may include a non-transitory computer-readable medium that includes non-transitory instructions for performing the method disclosed herein. The system controller 108 (electronics module 164 and/or computing device 168) may include a main electronic processor providing overall control, and one or more electronic processors configured for dedicated control operations or specific signal processing tasks. The system controller 108 (typically at least the computing device 168) may include one or more types of user interface devices, such as user input devices (e.g., keypad, touch screen, mouse, and the like), user output devices (e.g., display screen, printer, visual indicators or alerts, audible indicators or alerts, and the like), a graphical user interface (GUI) controlled by software, and devices for loading media readable by the electronic processor (e.g., non-transitory logic instructions embodied in software, data, and the like). The system controller 108 (typically at least the computing device 168) may include an operating system (e.g., Microsoft Windows® software) for controlling and managing various functions of the system controller 108.

It will be understood that FIG. 1 is a high-level schematic depiction of the optical imaging performance testing system 100 disclosed herein. As appreciated by persons skilled in the art, other components such as additional structures, devices, and electronics may be included as needed for practical implementations, depending on how the testing system 100 is configured for a given application.

Figure 2:
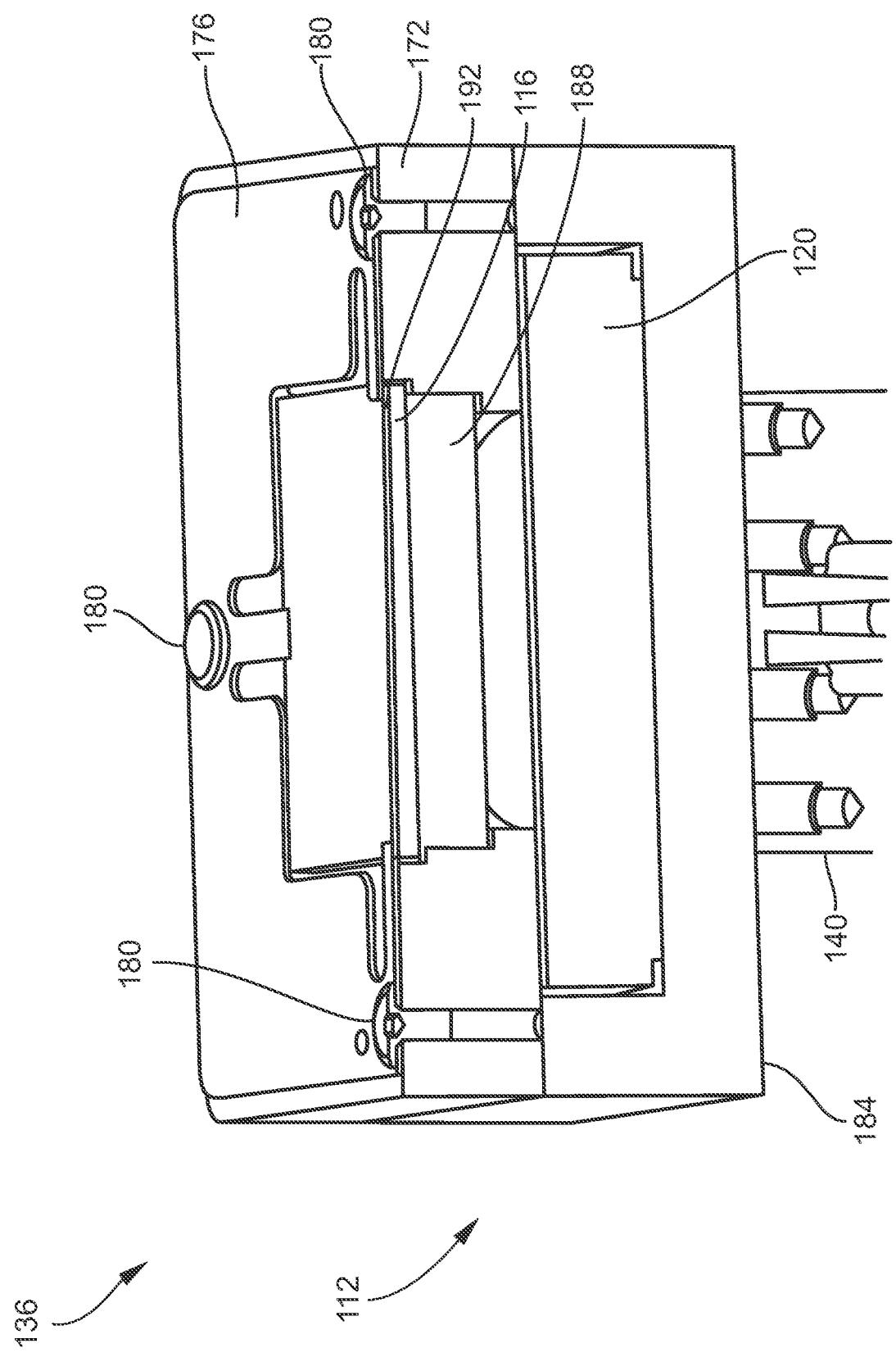
FIG. 2 is a schematic perspective cross-sectional view of an example of a target fixture of the optical imaging performance testing system according to an embodiment.

FIG. 2 is a schematic perspective cross-sectional view of an example of the target fixture 136 according to an embodiment. The target holder 112 may include a target support block 172, a clamping plate 176, and one or more fasteners 180. In the illustrated embodiment in which the light source 120 (an LED in the illustrated example) is integrated with the target fixture 136, the target fixture 136 may include a mounting member 184 for supporting and enclosing (and optionally serving as a heat sink for) the light source 120. The mounting member 184 may be part of or attached to the target support block 172. The target support block 172 includes annular shoulders for supporting the test target 116 and any suitable optics (e.g., a window 188) provided between the test target 116 and the light source 120. After mounting the test target 116 to the target support block 172, a coverglass (or cover slip) 192 may be placed on the test target 116. As one example, the coverglass 192 may have a thickness of 500±5 μm. The clamping plate 176 (which may be configured as a spring) is then secured to the target support block 172 using the fasteners 180 (which may be, for example, screws engaging threaded bores of the target support block 172) to secure the test target 116 and cover glass 192 in a fixed position in the target fixture 136.

Figure 3B:
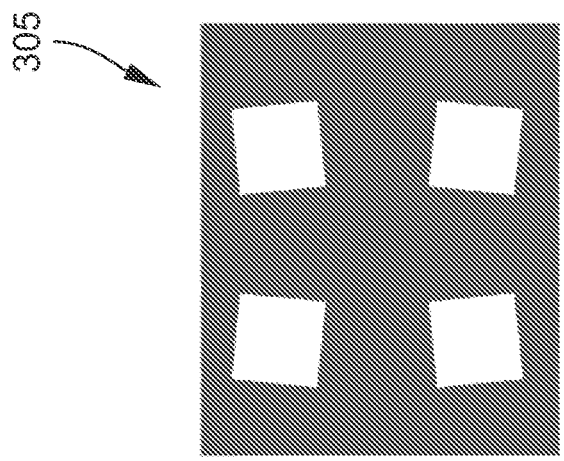
FIG. 3B is a detailed view of one section of the test target illustrated in FIG. 3A.
Figure 3A:
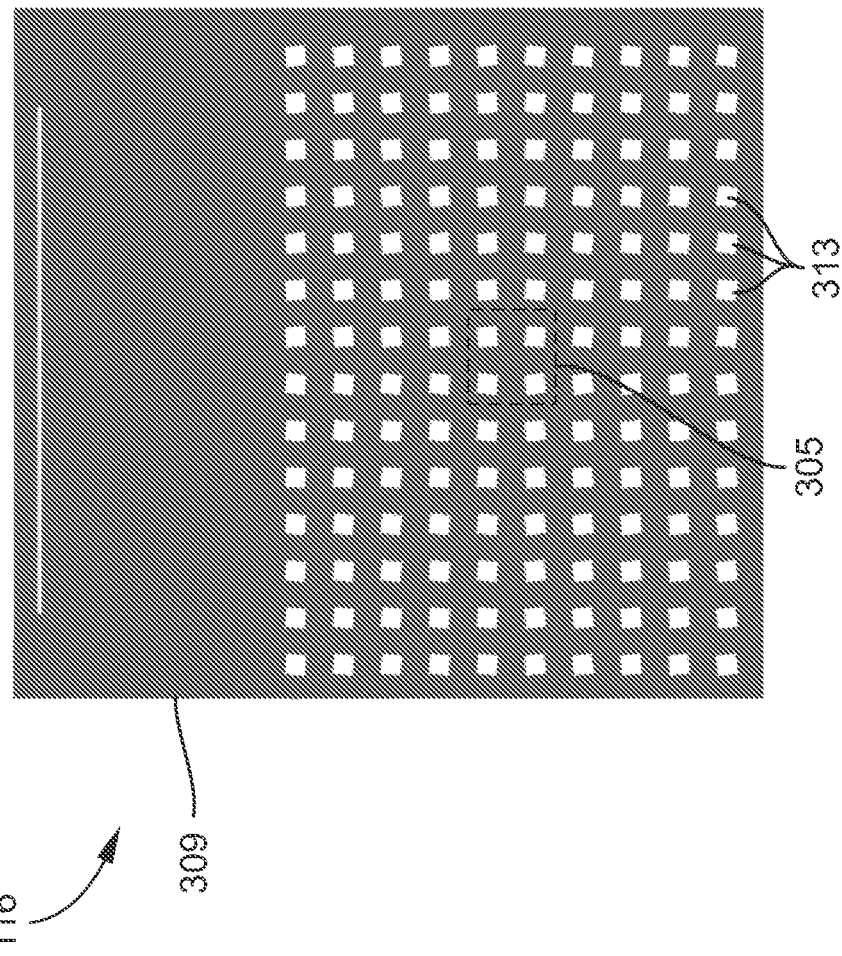
FIG. 3A is a schematic plan view an example of a test target of the optical imaging performance testing system according to an embodiment.
Figure 6A:
FIG. 6A is an example of a 3-D model of a true, relatively blurry PSF (having a true EE value of 0.349), otherwise similar to FIG. 4A.
Figure 6B:
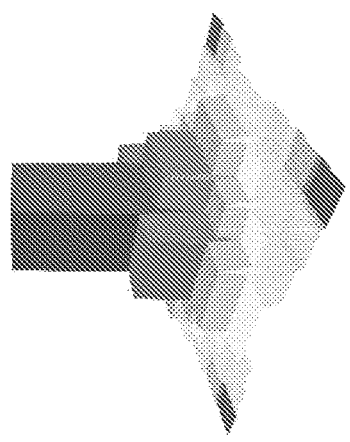
FIG. 6B is an example of a 3-D model of the same PSF related to FIG. 6A, derived from an LSF×LSF approximation.
Figure 6C:
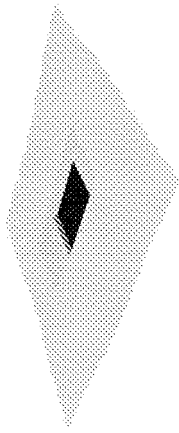
FIG. 6C is an example of a 3-D model of the same PSF related to FIG. 6A, where the PSF model is fit to Edge Spread Function (ESF) data.
Figure 6D:
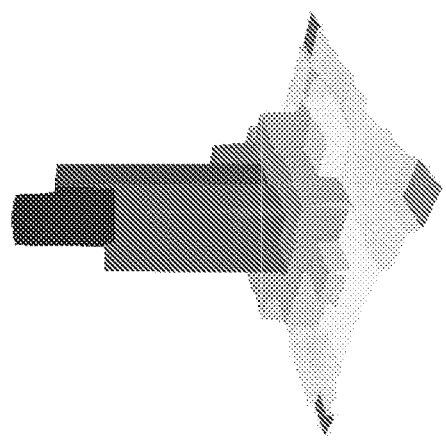
FIG. 6D is a 3-D model showing the difference between the PSF model of FIG. 6A and the PSF model of FIG. 6B.
Figure 6E:
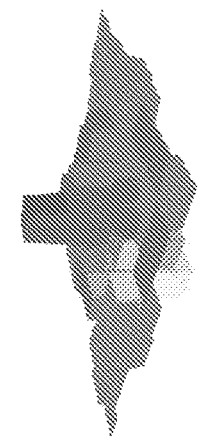
FIG. 6E is a 3-D model showing the difference between the PSF model of FIG. 6A and the PSF model of FIG. 6C.
Figure 6F:
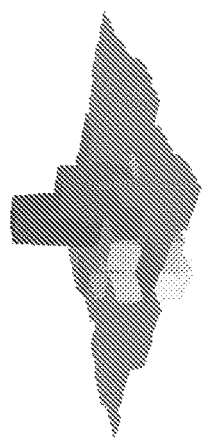
FIG. 6F is a 3-D model showing the difference between the PSF model of FIG. 6B and the PSF model of FIG. 6C.

FIG. 3A is a schematic plan view the test target 116 according to an embodiment. FIG. 3B is a detailed view of one section 305 of the test target 116. The test target 116 may be or include a substrate of planar geometry (e.g., plate-shaped) composed of (or at least including an outer surface composed of) a dark (light-absorbing) material 309, and a two-dimensional array (pattern) of bright (light-reflecting) target features 313 disposed on (or integrated with) the dark material 309. In the present context, the terms "dark" and "bright" are relative to each other. That is, for an implementation using reflected light illumination, the dark material is darker (more light-absorbing) than the target features 313, and the target features 313 are brighter (more light-reflecting) than the dark material 309. For an implementation featuring transmitted light illumination, the darker material is more light-absorbing and the brighter material better transmits light (more light-transmitting). The target features 313 preferably are polygons, thus providing edges showing the contrast between the bright features 313 and the surrounding dark material 309. In particular, the target features 313 may be rectilinear (squares or rectangles). In an embodiment and as illustrated, the target features 313 are tilted (rotated) in the plane of the test target 116 (the plane normal to the optical axis) relative to the horizontal and vertical directions, and particularly relative to the pixel arrays of the imaging devices 124 and 128. This is further shown in FIG. 8A, which is a detailed view of one section of the test target 116 as realized on the pixel array of either imaging device 124 and 128.

In one non-exclusive example, the dark material 309 is (or is part of) a fused silica substrate, and the target features 313 are a patterned chrome layer disposed on the substrate. The array of target features 313 is a 14×10 array of squares with 42 μm edges. The target features 313 are spaced apart (center to center) 92 μm on the long axis of the image and 94 μm on the short axis of the image. The target features 313 are tilted 100 mRad (about 5.73°) relative to the optical axis. The image is 19% light against a dark field. The chrome points toward the objective.

The testing system 100 may be utilized to perform a method for testing the imaging performance of the optical system 104. According to the method, the test target 116 is positioned at the object plane of the optical system 104 by securing the test target 116 in the target holder 112. Initial adjustments to the positioning of the various adjustable (staged) optical components (e.g., target holder 112, objective 132, tube lens assemblies 152 and 156, imaging devices 124 and 128, etc.) may be made. In addition, the wavelengths to be passed to the imaging devices 124 and 128 may be selected by adjusting the filter assembly 148. The light source 120 is then activated to generate the illumination light to illuminate the test target 116, resulting in imaging light emitted from the test target 116. The imaging light is focused by the objective 132 and tube lens assemblies 152 and 156 as image beam portions (split by the image separation mirror 144) onto the pixel arrays of the respective imaging devices 124 and 128 to acquire images of the test target 116 (within the field of view of the objective 132) from the respective image beam portions. The imaging data are then transferred from the imaging devices 124 and 128 to the system controller 108 for processing.

According to the method, the imaging data are utilized to calculate a plurality of Edge Spread Functions at a plurality of locations within the test target 116. Models of Point Spread Functions are then constructed from the respective Edge Spread Functions that were calculated. From these Point Spread Functions, a plurality of (estimated) values of Ensquared Energy, EE, are then calculated. Alternatively or additionally, Encircled Energy and/or Strehl ratio may be calculated.

Sharpness (Incl. Ensquared Energy) Estimation from Slant Edge Targets

In an embodiment, the method entails fitting experimental Edge Spread Functions (ESFs) using a basis set chosen such that the fit parameters can be utilized to create a model of the Point Spread Function. From that model, various measures of sharpness can be derived.

Sharpness Metric Definitions

Ensquared Energy

For a given PSF(x, y) centered around the point (x=0, y=0), the ensquared energy is the fraction of the PSF that falls within a square of area a centered around the same point:

$$EE_a = \frac{\int_{-\sqrt{a}/2}^{\sqrt{a}/2} \int_{-\sqrt{a}/2}^{\sqrt{a}/2} PSF(x, y) dx dy}{\int_{-\infty}^{\infty} \int_{-\infty}^{\infty} PSF(x, y) dx dy} \quad (2)$$

Encircled Energy

For a given PSF(x, y) centered around the point (x=0, y=0), the encircled energy is the fraction of the PSF that falls within a circle of radius r centered around the same point:

$$EncE_r = \frac{\int_0^r \int_0^{2\pi} PSF(r\cos(\varphi), r\sin(\varphi)) r dr d\varphi}{\int_{-\infty}^{\infty} \int_{-\infty}^{\infty} PSF(x, y) dx dy} \quad (3)$$

Strehl Ratio

For a given PSF, the Strehl ratio is the ratio of the maximum value of the normalized PSF (assumed here to occur at (x=0; y=0)) to that of a perfect, diffraction limited PSF. In the case of a circular pupil, the diffraction limited PSF is an Airy disk and the Strehl ratio is:

$$Str. = \frac{\frac{PSF(0, 0)}{\int_{-\infty}^{\infty} \int_{-\infty}^{\infty} PSF(x, y) dx dy}}{\frac{Airy(0, 0)}{\int_{-\infty}^{\infty} \int_{-\infty}^{\infty} Airy(x, y) dx dy}} \quad (4)$$

$$0 < Str. \leq 1 \quad (5)$$

Line Spread Functions (LSFs) and Edge Spread Functions (ESF)

One way to measure PSFs is to image an array of backlit holes as point sources, with the diameter of holes being substantially smaller than the Airy disk and the separation between holes being large enough that PSFs from neighboring point sources overlap to an insubstantial degree. The challenges of such an approach involve precise fabrication of such tiny features against a high OD target background (especially when testing a high-NA microscope) and the fact that the PSF decays in two dimensions as $1/r^2$ and legitimate signal quickly falls into the noise. Even with a currently available sensor with an excess of 70 dB of dynamic range and 10,000 $e^{-1}$ full well depth, it is possible to fail to identify PSF density several pixels away from the center of the PSF, and density in that area can rapidly decrease system Signal/Noise ratios (SNRs). Alternate experimental protocols involve fluorescent illumination of dilute mono-disperse coatings of quantum dots or single fluorophores, which can generate reliable point sources but still fall victim to the same SNR constraints as hole targets.

A common solution is to use an extended edge target instead of a pinhole, the so-called Slant Edge family of methods commonly used to generate Modulation Transfer Function (MTF) measurements. Such a target exploits line symmetry to look at the 1-D projection of a point spread function, known as a Line Spread Function (LSF):

$$LSF_x(x) = \int_{-\infty}^{\infty} PSF(x, y) dy \tag{6}$$

$$LSF_y(y) = \int_{-\infty}^{\infty} PSF(x, y) dx \tag{7}$$

Since the LSF decays as 1/r, analysis of the LSF is better able to catch extended density of the PSF several pixels away from the center. Rather than use pinholes to measure PSFs, edges are used to measure LSFs, with the resulting experimental profile known as an Edge Spread Function (ESF). Edges can either be aligned with the axes of the imaging system or slanted. To begin with, consider an edge that is aligned with a y axis, and which is described by the transmission function E(x, y):

$$E(x, y) = \begin{cases} 0 & \text{if } x < x_0 \\ 1 & \text{if } x \geq x_0 \end{cases} \tag{8}$$

The image of this is the 2-D convolution of the PSF with E(x, y) or equivalently the 1-D convolution of LSF(x) with E(x):

$$ESF(x) = \int_{-\infty}^{\infty} \int_{-\infty}^{\infty} E(x', y') PSF(x - x', y - y') dx' dy' \tag{9}$$

$$= \int_{-\infty}^{\infty} E(x') LSF(x - x') dx' \tag{10}$$

$$= \int_{x_0}^{\infty} LSF(x - x') dx' \tag{11}$$

$$ESF(x - x_0) = \int_{-\infty}^{x - x_0} LSF(x') dx' \tag{12}$$

Conceptually, it is straightforward to find LSF(x) as the derivative of the observed ESF(x) according to the following relation:

$$LSF(x) = \frac{d}{dx} ESF(x_0 - x) \tag{13}$$

However, in practice numerical differentiation of noisy data creates undesirable levels of noise. Instead, according an aspect of the present disclosure, Eqn. 12 is fitted directly as described below.

Approximation of the PSF Using Separable Functions

While it is more robust to measure LSFs instead of PSFs, the ultimate goal is to know the PSF. It is not formally possible to reconstruct the full 2-D PSF from two 1-D LSFs recorded along orthogonal directions. Instead, according an aspect of the present disclosure, the method (e.g., an algorithm as may be embodied in software executed by a control device) calculates an approximation of the PSF as follows:

$$PSF(x, y) \approx \frac{1}{c} [LSF_x(x) LSF_y(y)] \tag{14}$$

$$c = \int PSF(x, y) dx dy \tag{15}$$

The assumption is intolerable in two cases: (1) A very precise model of a well-corrected PSF is needed, for example looking at the locations of nulls in an Airy disk; and (2) The PSFs under evaluation are far from perfect (>¼ wave RMS wavefront error) and contain substantial asymmetries that are not even about the y or x axis such as coma experienced in the diagonal corner of a field where |y|~|x|.

Figure 7B:
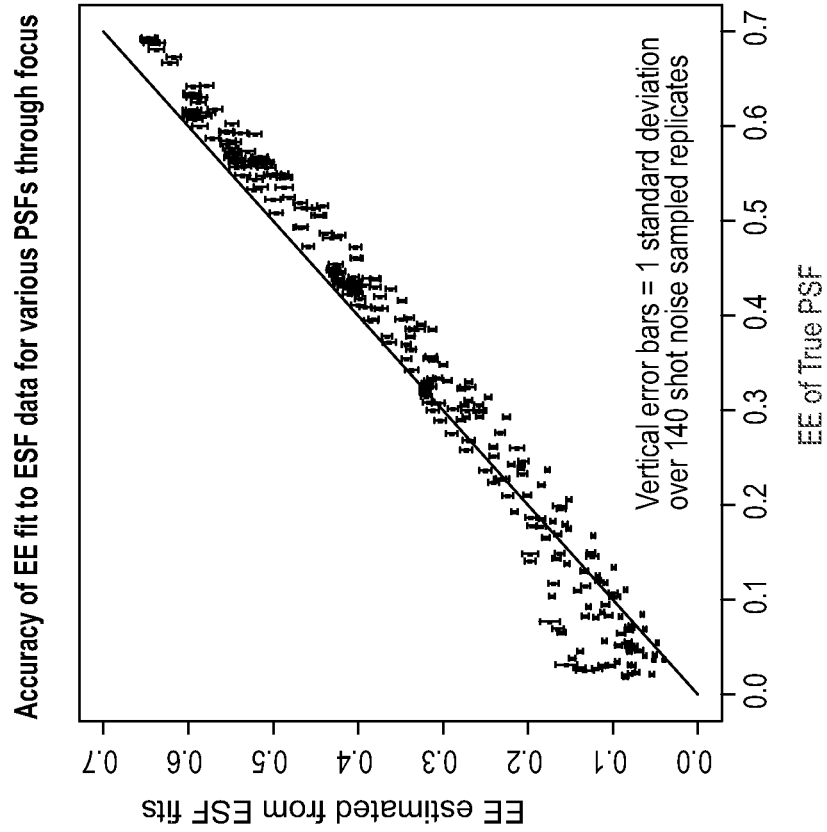
FIG. 7B is a plot of accuracy of EE fit to ESF data for various PSFs through focus.
Figure 7A:
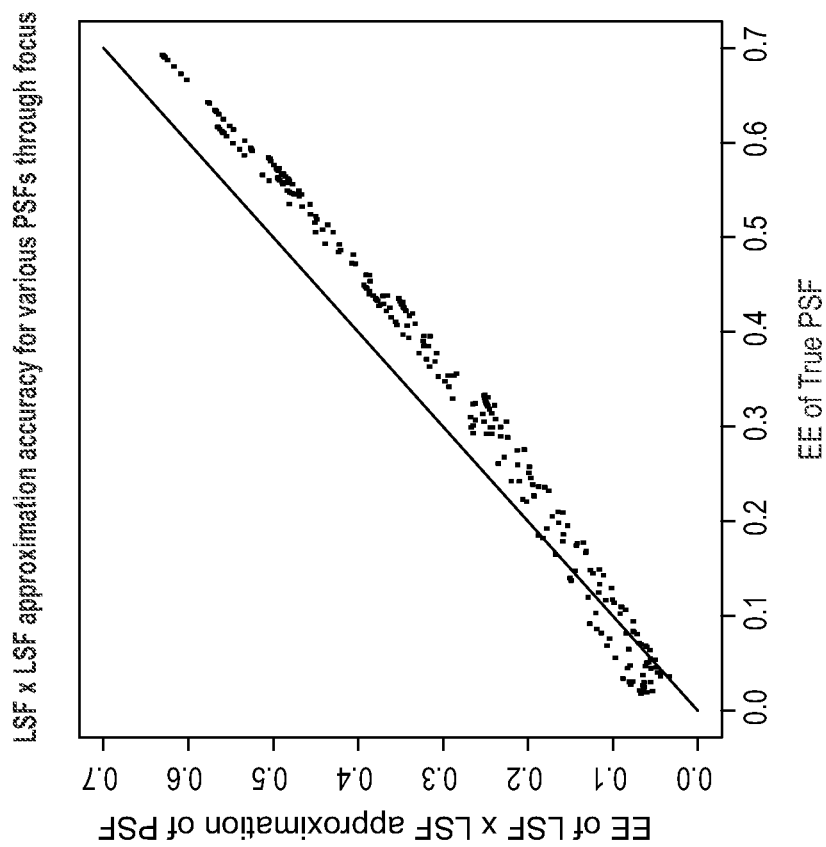
FIG. 7A is a plot of LSF×LSF approximation accuracy for various PSFs through focus.

The finite accuracy of the LSF×LSF approximation is evaluated in FIG. 7A (LSF×LSF approximation accuracy for various PSFs through focus). For the analysis, a collection of several known PSFs was projected into horizontal and vertical LSFs and an approximate PSF was re-calculated from their outer product using Eqn. 14. The ensquared energies ($EE_4$) were calculated for the original and approximated PSF across a 2×2 pixel area. The original PSFs were real world PSFs obtained from experimental wavefront error measurements of several field points of a high NA microscope system. For each of nine wavefront error measurements, thirty-one PSFs were generated by adding defocus terms before integrating across the pupil to obtain the image-space PSF. For sharper PSFs, the LSF×LSF approximation consistently underestimates the EE of the actual PSF by ~0:05, but does so in a precise enough way that empirical correction using a polynomial fit or other interpolating method can be performed to restore accuracy. For blurrier PSFs, the mean correspondence between the LSF×LSF approximation and the true PSF is better, but precision is poorer than the mean for EE<0.1. Despite poor relative precision with blurry PSFs, blurry PSFs are unambiguously identified as such and are not confused with sharp PSFs.

Overall the approximation is precise enough to enable meaningful comparisons of a system under test with PSF sharpness specifications.

Before a detailed description of the ESF fit process, it is helpful to describe the form of the pixelated input data and touch on practical concerns related to image registration.

Slant Edge Targets

Images of a slant edge target are the sole source of data for PSF fitting for this method, with the edges arranged in an array of squares, each with four edges. The use of slant edge ESF targets is well established. Considering the ESFs for a single edge, a data region can be extracted that is centered around the edge and proceeds for an arbitrary number of pixels either side of the edge, where the length is long enough to capture the whole ESF of a reasonably blurry PSF and also provide a good estimate of the baseline intensity levels for the fully dark and fully light portions of the image. With a slant edge target, multiple ESFs can be combined, for example if an edge is mostly vertical but with a $1/\alpha$ radian tilt, where $\alpha$ is a value around 10, a collection of a neighboring rows of an image can be collected and pooled such that each edge contains a unique replicate of the ESF, shifted by $1/\alpha$ pixels relative to the adjacent row. The resulting ESFs can then be viewed together and shifted by (row height)/$\alpha$ in x to align the midpoint of each ESF transition.

This dataset samples the ESF at intervals of $1/\alpha$ pixels, but does not per se increase resolution as each observation at a particular pixel is still an average over the active area of the pixel. Pixel active areas and geometries other than pitches may not be known for the particular sensor being employed. The pixel active areas are assumed to be 100% fill factor. The observed image around a vertical slanted ESF will be thus be modeled as follows:

$$Img(x, y) = b + m \int_{-h/2}^{h/2} ESF(x + x' - ay)dx' \tag{16}$$

In the current practice, 64 rows of images spanning 32 pixels (16 px either side of the edge) of slant edge targets with a=10 were pooled together for analysis. Outlier rejection eliminated one fourth of rows on the basis of distance from the median value of all rows together, with distance computed as the $l^2$ norm.

Image Registration
Crude Image Registration

The edges were identified by first computing single frequency Fourier Transforms of projections of the center of the image in both vertical and horizontal directions. The phase of the Fourier Transform was used to estimate the overall shift of the image by employing the known dimensions of the target, assuming a nominal magnification.

The image was broken into adjacent tiles and the centroid of each tile in x and also in y of each tile was computed along with the mean value of each tile. From the crude shifts of the FFT the approximate locations of each square of the image were known well enough to then compute the centroid of each square from the pre-computed centroid values, providing an early estimate of the locations of each square.

The global set of square (x; y) coordinates was fit to a linear model of rotation, translation and magnification to generate a revised estimate of square locations based on a global model.

Fine Image Registration

Each square was precisely located by identifying the centers of the four edges and averaging the location information. Fits to vertical edges were computed by computing the numerical derivative along each row and cubing the result to identify the edge, then using that product as a weight for a centroid calculation to estimate where the edge falls along the row coordinates. The collection of edge coordinates and row numbers were fit to a linear model of slope and offset using a robust statistics median of medians approach. The technique was repeated for all four edges, with rows and columns swapped for horizontal edges. The collection of edge offsets was used to estimate the centers of the squares, and the median value of slopes was used to compute the rotation angle of the squares for use in slanted edge calculations.

The fine registered fit values of the squares were then fit again to a global model of whole image translation, rotation and magnification. The results of this were applied to compute the relative orientations of two cameras in a multi-camera system, specifically relative image translation $\Delta x; \Delta y$ and rotation $\theta$. The magnification parameter was used to compute the overall magnification of each image. Distortion can be computed by modifying the fit functions to include a specific model of distortion or by collectively analyzing the residuals of the fit to a model that specifies a specific distortion model, e.g. no distortion.

Fitting PSF Models to ESF Data

According to embodiments of the present disclosure, several methods may be utilized to take ESF data and create a PSF consistent with the LSF×LSF approximation (Eqn. 14), as follows.

Direct Outer Product $LSF_x(x)$ and $LSF_y(y)$ can be computed directly from a numerical derivative of the vertical and horizontal ESF data (Eqn. 13), and the outer product can be taken. The resulting matrix will oversample the PSF by a factor of a where the edges are slanted by 1/a radians, and the images can be down-sampled by integration to produce a pixelated version of the PSF.

In another embodiment, however, this approach is not utilized for several reasons. First, it does not provide much averaging of the data, and is sensitive to noise in the numerical derivatives, which is generally high. Second, this is an estimate of the pixelated PSF and design specifications and tests frequently refer to the unpixelated PSF as the output of common optical modeling software.

Interpolating the ESF

The noise of the numerical derivatives can be reduced by fitting the ESFs to N smooth continuous functions with known derivatives, where N is less than the number of total data points in the experimental ESF.

$$ESF(x - x_0) = \sum_i^N a_i f_i(x - x_0) \tag{17}$$

$$LSF(x) = \frac{d}{dx} \sum_i^N a_i f_i(x_0 - x) \tag{18}$$

$$= \sum_i^N a_i \frac{d}{dx} f_i(x_0 - x) \tag{19}$$

This helps with noise, but like the prior method it does not fit to the un-pixelated PSF directly.

Fitting ESFs to a PSF Model

An improvement on fitting the ESFs to smooth functions is to first assume a particular model of a PSF, denoted $PSF^a$, and then derive analytical expressions for ESFs using the model. Key to this is that the PSF model is a separable function in x and y. A Gaussian basis set is chosen using logarithmically spaced inverse widths $b_i$, though other basis sets could be used in principle.

$$PSF^a(x, y) \propto \frac{1}{\pi} \left[ \sum_i^{N_g} a_{x,i} b_i \exp(-b_i^2 x^2) \right] \left[ \sum_i^{N_g} a_{y,i} b_i \exp(-b_i^2 y^2) \right] \tag{20}$$

$$LSF_x^a(x) = \int_{-\infty}^{\infty} PSF_x^a(x, y) dy \tag{21}$$

-continued $$LSF_x^a(x) = \frac{1}{\pi}\left[\sum_i^{N_g} a_{x,i} b_i \exp(-b_i^2 x^2)\right]\left[\sum_i^{N_g} a_{y,i} b_i \int_{-\infty}^{\infty} \exp(-b_i^2 y^2) dy\right] \quad (22)$$

$$LSF_x^a(x) \propto \sum_i^{N_g} a_{x,i} b_i \exp(-b_i^2 x^2) \quad (23)$$

where (x, y) are the field coordinates for points on the object plane within the test target 116, $N_g$ is the number of Gaussians employed to comprise the basis set utilized to model the PSF, $a_i$ is the set of coefficients that weigh the contribution of each Gaussian i in the model of Eqn. 20, and $b_i$ is proportional to the inverse square of the width of each Gaussian.

The unpixelated ESF can then be computed directly in terms of the coefficients:

$$ESF(x - x_0) = \int_{-\infty}^{x-x_0} LSF(x') dx' \quad (24)$$

$$\propto \sum_i^{N_g} a_{x,i} b_i \int_{-\infty}^{x-x_0} \exp(-b_i^2 x^2) \quad (25)$$

$$\propto \frac{1}{2} \sum_i^{N_g} a_{x,i} (\text{erf}(b_i(x - x_0)) + 1) \quad (26)$$

where erf(x) is the Gaussian error function, i.e. the definite integral of each Gaussian, and is commonly available in numerical libraries.

The pixelated ESF can be calculated by numerical integration of the unpixelated ESF:

$$ESF^p(x - x_0) = \int_{-1/2}^{1/2} ESF(x - x_0 + x') dx' \quad (27)$$

$$\propto \frac{1}{2} \sum_i^{N_g} a_{x,i} \left(1 + \int_{-1/2}^{1/2} \text{erf}(b_i(x - x_0 + x')) dx'\right) \quad (28)$$

Note that the fitting functions used to fit the LSF are symmetric about $x_0$ such that $LSF_x(x-x_0) = LSF_x(x_0-x)$. This symmetry is not strictly necessary, but was employed to reduce the fit space and increase equivalency of rising versus falling ESFs, i.e. ESFs from the right hand side of a square versus the left hand side of a square. The upper and lower fit regions of the ESFs are statistically quite different, as images from high gain sensors are shot noise limited counting processes and in absolute terms the variances of the lower, darker portion of the ESF data are lower than the variances of ESF data at the top. If weighted linear least squares fits of the ESFs are performed using the signal level of each ESF data point (in units of photoelectrons) as a weight equivalent to its variance, this results in different fits to left and right ESFs for PSFs with LSFs that are asymmetric about the origin.

Alternate algorithms could make use of a different basis set in Eqn. 20 that disregards the explicit symmetry used here. Such basis sets could be functions commonly used for interpolation such as B-splines, polynomials, or a combination such as Gaussians as employed in Eqn. 20 together with polynomials of odd powers or cosine functions of varying frequencies to allow a fit of an asymmetric LSF. Simultaneous linear least squares fits of rising and falling ESFs (e.g. left and right edges of the squares) could use shot noise derived weights to fit asymmetric LSFs to asymmetric basis functions.

Numerical Fitting

In practice the image data are fit using linear least squares. QR factorization is used as part of the known DGELS LAPACK (linear algebra package) routine as implemented in the INTEL MKL Math kernel library. The Image data Img are fit using the design matrix D to obtain fit coefficients Ai. Several pre-computed versions of D exist, using nine different offsets $x_0$ and every row of data will use rows of D corresponding to an $x_0$ value closest to the $x_0$ value of the data.

$$Img = DX \quad (29)$$

$$dim[D] = (ND, N_g + 1) = (32, 7) \quad (30)$$

$$D[i, j](x_0) = \begin{cases} 1 & i = 0 \\ \frac{1}{2}\left[1 + \int_{-1/2}^{1/2} \text{erf}\left(f_H s^{i-1}\left(j - \frac{ND}{2} - x_0 + x'\right)\right) dx'\right] & i > 1 \end{cases} \quad (31)$$

$$f_H = 4 \quad (32)$$

$$s = 0.4 \quad (33)$$

The fit coefficient X[0] represents the baseline intensity of the image due to background noise and bleed-through of the test target. If the data being fit are a vertical Edge resulting in $ESF_x(x)$, the coefficients X[1]; X[2]; . . . ; X[$N_g$] represent the coefficients $\alpha_{x:1}, \alpha_{x:1}, \ldots, \alpha_{x:N_g}$ in Eqn. 20. If the data being fit are a horizontal Edge resulting in $ESF_y(y)$, the coefficients X[1], X[2]; . . . ; X[$N_g$] represent the coefficients $\alpha_{y,1}; \alpha_{y,1}; \ldots; \alpha_{y,N_g}$ in Eqn. 20.

Reconstructing the PSF Model and Calculating Sharpness

A model of the PSF can be reconstructed from the fit coefficients $\alpha_i$ obtained in the previous section. Several different models represent different levels of knowledge. The most complete model combines the vertical and horizontal LSFs using Eqn. 20 and ensquared energy can be directly computed from simple products of sums of the coefficients.

$$EE_4 = \frac{\left[\sum_i^{N_g} a_{x,i} b_i \int_{-1}^{1} \exp(-b_i^2 x^2) dx\right]\left[\sum_i^{N_g} a_{y,i} b_i \int_{-1}^{1} \exp(-b_i^2 y^2) dy\right]}{\left[\sum_i^{N_g} a_{x,i} b_i \int_{-\infty}^{\infty} \exp(-b_i^2 x^2) dx\right]\left[\sum_i^{N_g} a_{y,i} b_i \int_{-\infty}^{\infty} \exp(-b_i^2 y^2) dy\right]} \quad (34)$$

$$= \frac{\left[\sum_i^{N_g} a_{x,i} \text{erf}(b_i)\right]\left[\sum_i^{N_g} a_{y,i} \text{erf}(b_i)\right]}{\left[\sum_i^{N_g} a_{x,i}\right]\left[\sum_i^{N_g} a_{y,i}\right]} \quad (35)$$

The accuracy of this method is discussed below.

Encircled energy can likewise be computed by evaluating Eqns. 3 and 20 numerically. The Strehl ratio takes a simple form:

$$Str. = \frac{\left[\sum_i^{N_g} a_{x,i}b_i\right]\left[\sum_i^{N_g} a_{y,i}b_i\right]}{\left[\sum_i^{N_g} a_{x,i}\right]\left[\sum_i^{N_g} a_{y,i}\right]} \frac{\int_{-\infty}^{\infty}\int_{-\infty}^{\infty} Airy(x,y)dxdy}{Airy(0,0)} \quad (36)$$

Alternate Simple PSF Model

While the PSF is a fundamentally 2-D concept, it has been useful to express the EE of a PSF that was determined on the assumption that both the vertical and horizontal LSFs are identical. Such uses include looking for astigmatism in the image by comparing the focal positions that maximize EE estimated from a horizontal ESF vs. EE estimated from a vertical ESF. To this end, a simple PSF model has been employed with a very limited number of fit coefficients di.

$$PSF(x,y) = \frac{1}{\pi}\sum_i^{N_g} a_i b_i^2 \exp(-b_i^2 x^2)\exp(-b_i^2 y^2)) \quad (37)$$

$$ESF(x) = \frac{1}{2}\left[1 - \sum_i^{N_g} a_i \text{erf}(b_i x)\right] \quad (38)$$

$$EE_4 = \sum_i^{N_g} a_i \text{erf}(b_i)^2 \quad (39)$$

This form of data feedback is the primary method by which system alignment has been performed and has proven to be quite robust in operation.

The model of Eqn. 37 was chosen to be separable with respect to x and y, such that a 2-D reconstruction of the PSF can be obtained from ESF data that only contain information about a one dimensional LSF. As such, the model may be incapable of representing complex PSFs that result from a highly aberrated or defocused system, but is adequate to describe a PSF of a well-compensated and in-focus system. The ESF can be further modified to reflect the degradation of the PSF by the contribution of the detector MTF, which in the worst case is achieved by averaging the exact ESF of Eqn. 38 over the entire length of each pixel.

Data fitting, for example based on linear least squares regression, is performed by fitting Eqn. 38 against experimental data to obtain coefficients $a_i$. The PSF model is constructed by evaluating Eqn. 37 using the values of $a_i$ obtained from the fit. The EE values are then analytically calculated by integrating Eqn. 37 over a square region to obtain Eqn. 39.

Accuracy of the Algorithm

The accuracy of the whole algorithm was assessed using synthetic images with known PSFs, using the same real-world PSFs used to assess the accuracy of the LSF×LSF approximation. The PSFs were then convolved with an image of an infinitely sharp test target. The convolution represents an ideal noise-less image with a grid of 10×14 slanted squares. The squares provide testing variety in that they are not superimposable on each other because the placement of each square relative to the camera pixel grid differs on a sub-pixel level depending on where the center of the square falls. To understand the effects of shot noise on the data, images were first scaled to match the intensities in actual images of the target, and a baseline was added to add the effects of system background intensity and bleed-through of the test target. The scaled images were expressed in units of photoelectrons. A shot noise sampled image was created from this scaled image by sampling the intensity of each pixel from a distribution calculated specifically for each pixel. The shot noise Poisson distribution was approximated as a normal distribution that had a mean corresponding to the mean of the scaled image and a variance also equal to the mean of the image. The images were finally scaled to 12 bit depth as the upper bits of a 16 bit TIFF by using a scale factor of 10,550 photoelectrons per $2^{16}-1$ image counts.

After each image was created, it was run through the full analysis pipeline to estimate the ensquared energy of each square using Eqn. 35. Additionally, models of the PSFs were created from the fit coefficients $a_{x,i}$ and $a_{y,i}$, to allow for direct comparison. FIGS. 4A-4F show the results from a reasonably sharp PSF with a true EE of 0.594. 3-D plots of the PSF depict the true PSF (FIG. 4A), the PSF derived from the LSF×LSF approximation (FIG. 4B), and finally the PSF model that was recovered from analyzing the synthetic images and fitting the ESF data (FIG. 4C). Differences between the three PSFs are shown FIGS. 4D-4F, using the same vertical scale. As expected, the PSF models bare a strong resemblance to the LSF×LSF approximation. Note that the density of the true PSF at the base falls off faster in the front right of the plots than it does in the front left of the plots. That property is retained by the LSF×LSF model, and the PSF model from ESF data faithfully recovers it too. The LSF×LSF approximation gives rise to underestimation of the peak and overestimation of horizontal and vertical rows and columns emanating from the peak. This results in an underestimation of the true EE and is unavoidable given the approximation. When the PSF is viewed from above, this results in a characteristic "+" shaped PSF model. Nonetheless, the faithful reconstruction of the LSF×LSF model and accurate calculation of the EE solely from fit coefficients $\alpha_{x,i}$ and $\alpha_{y,i}$, suggests that the ESF fitting procedure is behaving as expected.

Two additional PSFs are fit in the same manner, and are shown in FIGS. 5A-5F and 6A-6F, which depict sharp and blurry PSFs, respectively. Note that the asymmetry of the blurrier PSF is not adequately captured by the LSF×LSF model, as predicted.

The synthetic image analysis was repeated for nine different experimental PSFs calculated over a range of thirty-one different focus positions, using the same PSFs used in FIG. 7A. A scatter plot of EE estimated using Eqn. 35 versus the EE of the known starting PSF is shown in FIG. 7B. Each point of the scatter plot represents an image comprised of 10×14 squares, with each square sampled independently with the expectation that they will produce the same estimate of EE along with noise resulting from both shot noise and algorithmic errors, if any, that are exposed when presented with multiple squares that differ with regard to sub-pixel placement. The error bars represent the standard deviation over all 140 measurements. Points exhibit a natural clustering in various locations that results from PSF generation creating a series of similar PSFs around the optimal focus of each PSF.

EE is underestimated by the algorithm, which is expected given the core LSF×LSF approximation. The EE estimates would be expected to exactly match the LSF×LSF approximations, but in this case they are slightly elevated. While this does make the overall estimates more accurate it also exposes an opportunity to improve the performance of the ESF fitting and EE estimation numerical methods.

The accuracy of EE estimates in FIG. 7B is quite acceptable for the purposes of instrument testing, and demonstrates that the fundamental approach taken by the method disclosed herein is capable of generating usable data and a useful test platform.

Precision of the Algorithm

Figure 7C:
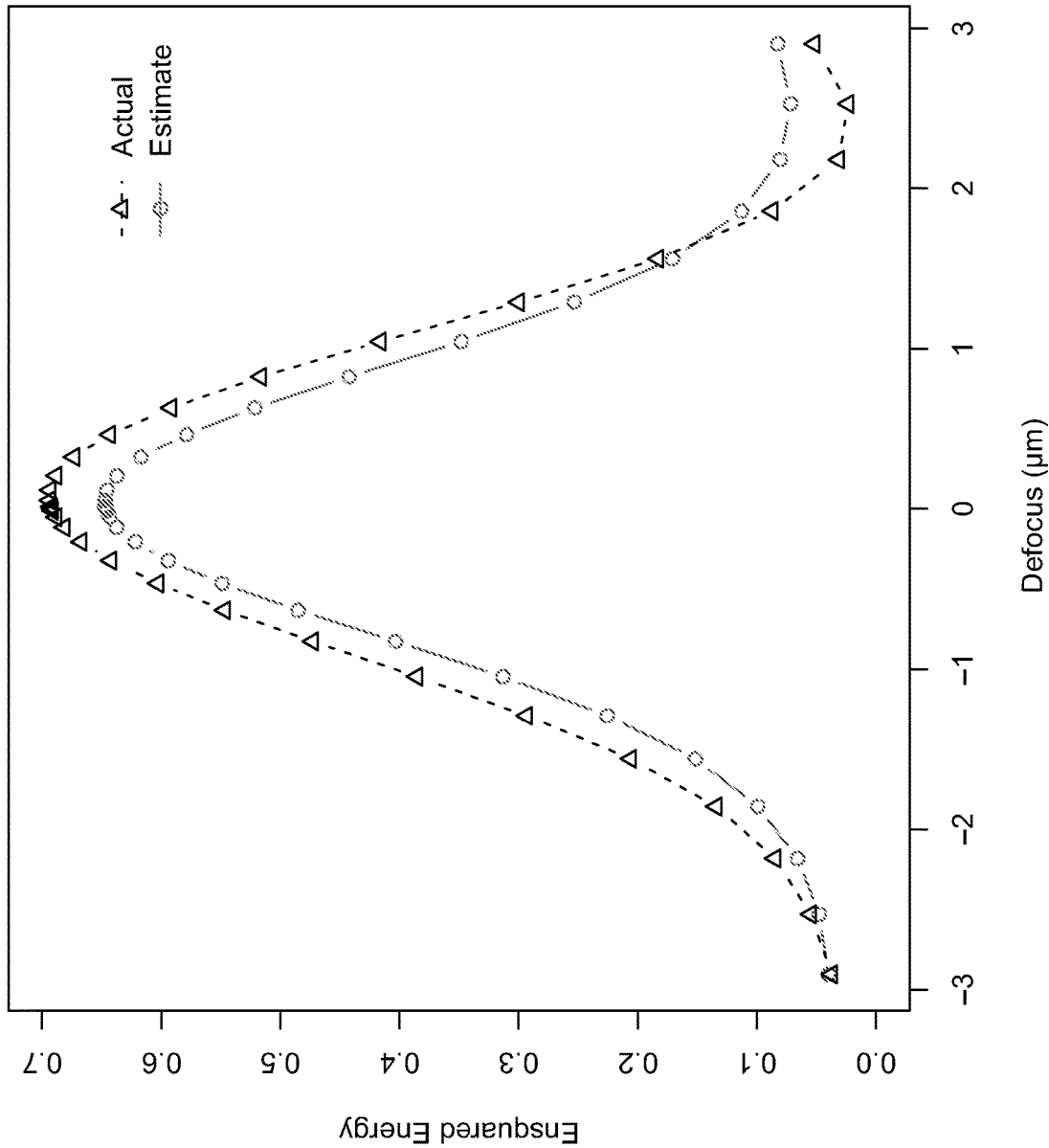
FIG. 7C is a plot of accuracy of EE estimate for one PSF through focus.

The precision of the algorithm is acceptable as judged by the relatively tight standard deviations of EE estimates in FIG. 7B. However, the use of feedback for optical alignment presents an additional level of requirements beyond just a tight standard deviation. When performing optimizations, typically with small perturbations to the system, it is important that feedback signal does not jump around as a function of the adjustment variable. FIG. 7C is a plot of EE versus focus position illustrating that the algorithm provides a very smooth and predictable response curve to the perturbation of defocus. While the distance between the red and black lines (or circular and triangular data points, respectively) indicates that EE is underestimated, it is systematically and consistently underestimated and the inaccuracy of the method does not jump around wildly as defocus position changes from point to point. This curve is thus amenable to higher level interpretation and fitting e.g. to determine the defocus position at which EE is maximized.

It was noted above that alternate basis sets could be utilized to approximate the LSF, including basis sets that permitted the fitting of asymmetric LSFs. If such methods were utilized, they could likely generate a better accuracy than is shown in FIG. 7B. However, it would be necessary to validate that the response curve of the form of FIG. 7C is smooth enough for optimization use. An unproven concern is that the use of a larger number of fitting parameters would compromise smoothness. However, this assumption remains untested and higher accuracy models might defy expectations and actually be as smooth or smoother.

EE Score

The Ensquared Energy (EE) values may be utilized as a metric of the imaging performance of the optical system 104 under test. The user may make initial settings or adjustments to the optical components of the system (e.g., alignment between components, and between components and the test target 116). The user may then run the test of the optical system 104 according to the method described herein. Based on the results of the test, the user may determine whether further adjustments should be made to improve the results (e.g., further optimize alignment and focus). After making any further adjustments, the user may then run the test again. Iterations of testing and adjusting may continue until the results are deemed acceptable.

The optical system 104 may be determined to have successfully passed the imaging performance test if all field points in the image exceed a predetermined minimum threshold EE value (e.g., EE>0.51). However, assessing imaging performance solely on the basis of whether all EE values pass may in some circumstances be considered disadvantageous. This approach may be unforgiving in a case where the optical system 104 exhibits a few dull spots but otherwise is a sharp (high image quality) system. Moreover, as optical performance is continuously assessed during the progress of an alignment procedure, discontinuities arising from the use of thresholding make thresholding methods problematic to use as an optimization process where continuous metrics are preferred (e.g., aligning to laser power, or aligning to minimum root mean square (RMS) wavefront error), and the thresholding effects may not be conducive to manufacturing yield calculations.

To overcome the foregoing potential disadvantages, in a further embodiment of the presently disclosed method, an EE score, $E_S$, is calculated based on the EE values. The EE score describes the entire field with a single continuous variable that is required to exceed (or meet or exceed) a predetermined minimum threshold to pass the imaging performance test. For example, the EE score may be weighted such that $E_S \geq 100$ is a passing score. The EE score has two components: <EE> is the spatial mean of all EE values observed in all field points over the specified depth of field; and the overlap integral EO measures the consistency of EE among different imaging channels (e.g., four channels corresponding to four colors to which the images are filtered, where in the illustrated embodiment, two imaging devices 124 and 128 are utilized in conjunction with the adjustable filter assembly 148 to each acquire images in two of the four channels). EO is rewarded if sharp and blurry regions are coincident in both field position (x, y) and focal position (z). EO is penalized if the four channels are inconsistent, for example if the two imaging devices 124 and 128 are not focused well enough relative to each other, or if the blue channel is sharp in the upper left corner and blurry in the lower right corner while the red channel is opposite, etc. The EE score and its components and are calculated according to Eqns. 40-43 below.

$$E_S = \frac{100}{0.55}\left[\frac{1}{4}\sum_{c=1}^{4}\langle EE_c\rangle - \frac{10}{6}\sum_{c_1=1}^{4}\sum_{c_2=1}^{c_2<c_1}EO_{c_1,c_2}\right] \quad (40)$$

$$\langle EE_c\rangle = \frac{1}{N_x N_y 650 \text{ nm}}\sum_{x=1}^{N_x}\sum_{y=1}^{N_y}\int_{-325\,nm}^{325\,nm}EE_{c,x,y}(z)dz \quad (41)$$

$$EO_{c_1,c_2} = \frac{1}{N_x N_y 650 \text{ nm}}\sum_{x=1}^{N_x}\sum_{y=1}^{N_g}\int_{-325\,nm}^{325\,nm} \quad (42)$$

$$\left(\frac{EE_{c_1,x,y}(z)}{\langle EE_{c_1}\rangle} - \frac{EE_{c_2,x,y}(z)}{\langle EE_{c_2}\rangle}\right)^2 dz$$

$$= \frac{\langle EE_{c_1}^2\rangle}{\langle EE_{c_1}\rangle^2} - 2\frac{\langle EE_{c_1}EE_{c_2}\rangle}{\langle EE_{c_1}\rangle\langle EE_{c_2}\rangle} + \frac{\langle EE_{c_2}^2\rangle}{\langle EE_{c_2}\rangle^2} \quad (43)$$

where again x and y represent the field points arrayed in a grid of size $N_x$ by $N_y$, c is the color (e.g., in a four-channel embodiment, colors 1, 2, 3, and 4 might correspond to blue, green, red, and amber), z is the focal position, and nm is nanometers.

While the EE score considers the contributions from all channels, it is also useful to have a similar score considering a single channel at a time and which only considers homogeneity over field positions and focus positions. The per-channel EE score $EC_c$ is such an example, with the heterogeneity of a single channel being captured in Eqn. 45, similar to variance over mean squared.

$$EC_c = \frac{100}{0.55}[\langle EE_c\rangle - 5EH_c] \quad (44)$$

$$EH_c = \frac{1}{N_x N_y 650 \text{ nm}}\sum_{x=1}^{N_x}\sum_{y=1}^{N_y}\int_{-325\,nm}^{325\,nm}\left(\frac{EE_{c,x,y}(z)}{\langle EE\rangle} - 1\right)^2 dz \quad (45)$$

$$= \frac{1}{N_x N_y}\sum_{x=1}^{N_x}\sum_{y=1}^{N_y}\left[1 + \frac{1}{650 \text{ nm}}\left[\int_{-325\,nm}^{325\,nm}\frac{EE_{c,x,y}^2(z)}{\langle EE\rangle^2}dz - 2\int_{-325\,nm}^{325\,nm}\frac{EE_{c,x,y}(z)}{\langle EE\rangle}dz\right]\right] \quad (46)$$

$$= \frac{\langle EE_c^2\rangle}{\langle EE_c\rangle^2} - 1 \quad (47)$$

If the integral in Eqn. 45 is zero, then the penalty represented by the heterogeneity EH will be zero.

Fitting EE vs. Z

The integrals in Eqns. 41, 42 and 45 aim to characterize the imaging performance over focus and could be computed using simple sums of experimental data. Alternately, the integrals could be computed by first fitting experimental pairs of EE values and their corresponding z locations to a Gaussian profile (Eqn. 48). The integrals are then computed as analytical solution of the definite integrals of the Gaussian fit function per Eqns. 48-54 below.

$$EE(z) = a \exp(-(z-z0)^2/w^2) \quad (48)$$

$$\int_{z_1}^{z_2} EE(z')dz' = a \int_{z_1}^{z_2} \exp(-(z'-z0)^2/w^2)dz' \quad (49)$$

$$t = \frac{z'-z0}{w} \quad (50)$$

$$\mathrm{erf}(x) = \frac{2}{\sqrt{\pi}} \int_0^x \exp(-t^2)dt \quad (51)$$

$$\int_{z_1}^{z_2} EE(z')dz' = aw \int_{(z_1-z0)/w}^{(z_2-z0)/w} \exp(-t^2)dt \quad (52)$$

$$= aw\left[\int_0^{(z_2-z0)/w} \exp(-t^2)dt - \int_0^{(z_2-z0)/w} \exp(-t^2)dt\right] \quad (53)$$

$$= \frac{qw\sqrt{\pi}}{2}\left[\mathrm{erf}((z_2-z0)/w) - \mathrm{erf}((z_1-z_0/w))\right] \quad (54)$$

where a is the peak EE value obtained over focus, w is the Gaussian width and z0 is the z value corresponding to the peak EE value. This is of particular utility in that it allows for relatively crude z steps to be taken (and thus less data acquisition) while still accurately capturing z0 to within a fraction of the z-step size. Eqn. 54 may be utilized to calculate the integral in Eqn. 41 above.

For EO calculations, the overlap integrals between different channels in Eqn. 43 could also be computed using analytical integrals of a Gaussian fit of experimental data as illustrated in Eqns. 55-62:

$$\int_{z_1}^{z_2} (EE_{c_1,x,y}(z')EE_{c_2,x,y}(z'))dz' \quad (55)$$

$$= a_1 a_2 \int_{z_1}^{z_2} \exp\left(-\frac{(z'-z0_1)^2}{w_1^2}\right)\exp\left(-\frac{(z'-z0_2)^2}{w_{21}^2}\right)dz' \quad (56)$$

$$= a_1 a_2 \exp\left[-\frac{(z0_1-z0_2)^2}{w_1^2+w_2^2}\right]\int_{z_1}^{z_2} \exp\left(-\frac{(z'-z0_p)^2}{w_p^2}\right)dz' \quad (57)$$

$$= \frac{a_1 a_2 w_p \sqrt{\pi}}{2}\exp\left[-\frac{(z0_1-z0_2)^2}{w_1^2+w_2^2}\right] \quad (58)$$

$$\left[\mathrm{erf}\left(\frac{z_2-z0_p}{w_p}\right) - \mathrm{erf}\left(\frac{z_1-z0_p}{w_p}\right)\right]$$

$$z0_p = \frac{z0_1 w_2^2 + z0_2 w_1^2}{w_1^2 + w_2^2} \quad (59)$$

$$w_p = \sqrt{\frac{w_1^2 w_2^2}{w_1^2 + w_2^2}} \quad (60)$$

$$\int_{z_1}^{z_2} EE^2(z')dz' = a^2 \quad (61)$$

$$\int_{z_1}^{z_2} \exp\left(-\frac{(z'-z0)^2}{w^2/2}\right)dz'$$

$$= \frac{a^2 w \sqrt{\pi}}{2\sqrt{2}}\left[\mathrm{erf}(\sqrt{2}(z_2-z0)/w) - \mathrm{erf}(\sqrt{2}(z_1-z0)/w)\right] \quad (62)$$

where $w_1$ and $w_2$ are the Gaussian widths corresponding to channel 1 and 2. The product of two Gaussians is itself a third Gaussian centered at z0, with width $w_p$. Eqns. 55-62 may be utilized to calculate Eqn. 56 above.

Penalties Indicate how Much Performance was Lost to Various Optical Defects

Beyond estimating the present EE score for the optical system 104, the method may entail communicating to the user how much potential score is lost due to one or more artifacts, or optical defects (e.g., aberrations). In this manner, the method may inform the user as to which specific defects are negatively impacting the imaging performance the most. For this purpose, the method may calculate one or more penalties associated with one or more respective artifacts. Penalties are the difference between the current EE score and the score that would be obtained were the defect(s) accounted for. The method may include displaying information corresponding to penalties across the field of the image displayed to the user. When considering just the <EE> contribution to the EE score (without the overlap scores EO), the penalty calculations should always result in a larger <EE> quantity. The penalty is communicated as the difference between the actual score and the artificially increased score, which should always be a negative number. When considering the overlap scores EO, a penalty calculation may occasionally result in a positive number.

One example of a penalty is the penalty from imaging device (e.g., camera) Z-shift. In calculating this penalty, the method may assume that both imaging devices 124 and 128 could be focused optimally relative to each other, but does not assume that axial chromatic aberrations within the imaging devices 124 and 128 are zero. The method calculates the ideal focus position for the first imaging device 124 as the average of the two sets of wavelength-filtered imaging data the first imaging device 124 acquires (e.g., the average of blue and green data). The method also calculates the ideal focus position for the second imaging device 128 as the average of the two sets of wavelength-filtered imaging data the second imaging device 128 acquires (e.g., the average of red and amber data).

Another example of a penalty is the penalty from imaging device (e.g., camera) tilt. For each channel, the method constructs a focal surface as the average of both colors (e.g., blue and green in channel 1), fits it to a plane using linear least squares to find the tip and tilt portions which are then removed from the focal plane while preserving the focus difference for each imaging device 124 and 128.

Another example of a penalty is the penalty from astigmatism. The EE scores for horizontal and vertical LSFs are calculated independently, allowing the focal plane tilt and height to be optimal for each direction. The maps are then averaged together to create the final estimate.

Another example of a penalty is the penalty from axial chromatic aberrations. This penalty is calculated twice, once for each channel. For channel 1, the optimal focus for the two colors (e.g., blue and green) is found for each, the difference is split, and each channel is offset by that amount. The resulting focal positions may still be non-ideal because of imperfect camera-camera focus differences.

Another example of a penalty is the penalty from field flatness. This penalty is calculated twice, once for each channel. For channel 1, the optimal focal surfaces of the exposures of the two colors (e.g., blue and green exposures) are averaged together, and an optimal fit plane is subtracted from the focal position of the (e.g., blue and green) data, while channel 2 is treated normally. This penalty potentially may have conflicting interpretations. For example, if both channels are equally non-flat, they will both suffer in terms of <EE> but the overlap EO will be enhanced in a productive way. Flattening out a channel will eliminate both effects. Typically the <EE> effect will dominate, but this is not guaranteed.

Figures 8A, 8B:
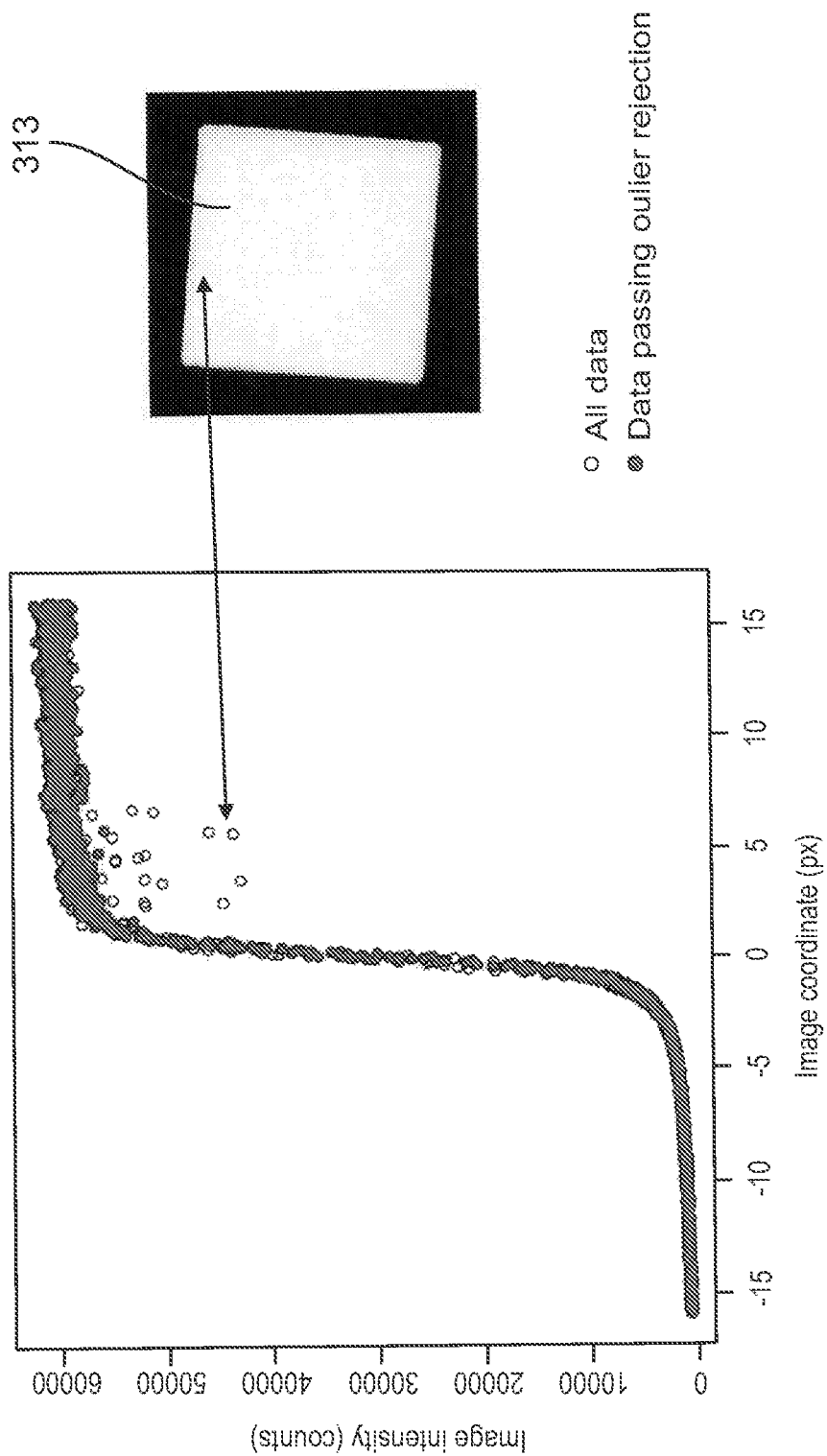
FIG. 8A is an example of an image acquired from one of the target features of the test target illustrated in FIG. 3A.
FIG. 8B is an example of ESF calculated from the image of FIG. 8A. The ESF has been cleaned up using outlier rejection.

FIG. 8A is an example of an image acquired from one of the target features 313 of the test target 116. FIG. 8B is an example of ESF calculated from the image of FIG. 8A. In FIG. 8B, the image coordinate zero corresponds to one of the edges of the imaged target feature 313. Some of the data points in FIG. 8B are outliers. As illustrated, one or more of these outliers may correspond to dark artifacts (e.g., dirt or debris from fabrication) on the target feature 313. The method may include rejecting (e.g., ignoring or removing) the outliers in the ESF data.

Figure 9:
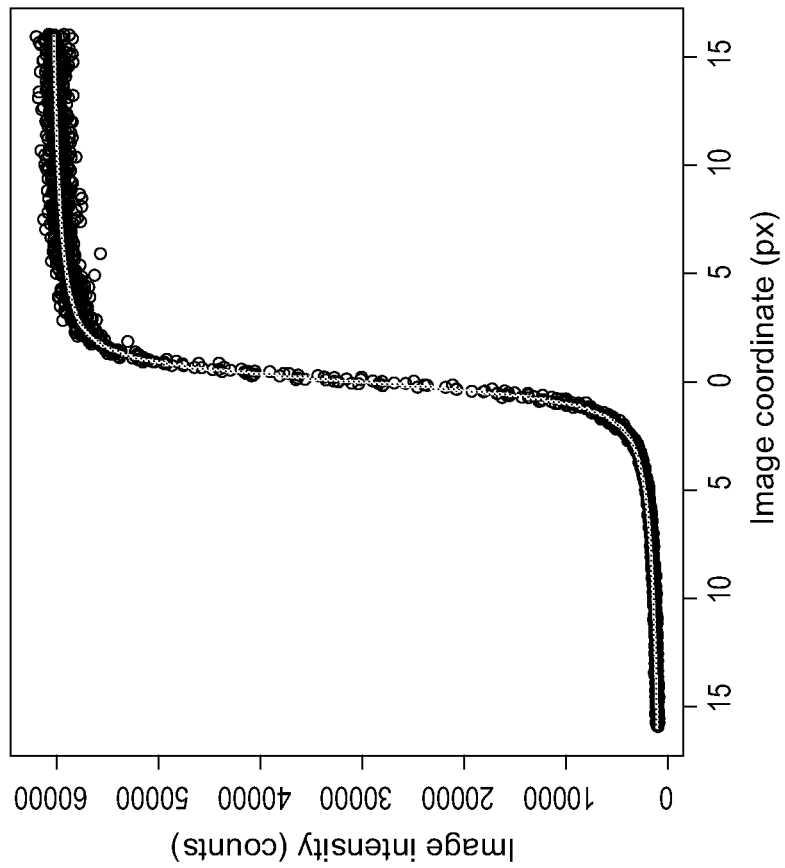
FIG. 9 is an example of the result of fitting the ESF of FIG. 8B to a model consisting of a linear combination of error functions and calculating EE from the coefficients of the resulting model.

FIG. 9 is an example of the result of fitting the ESF of FIG. 8B to the error function and calculating EE from the ESF.

Figure 10:
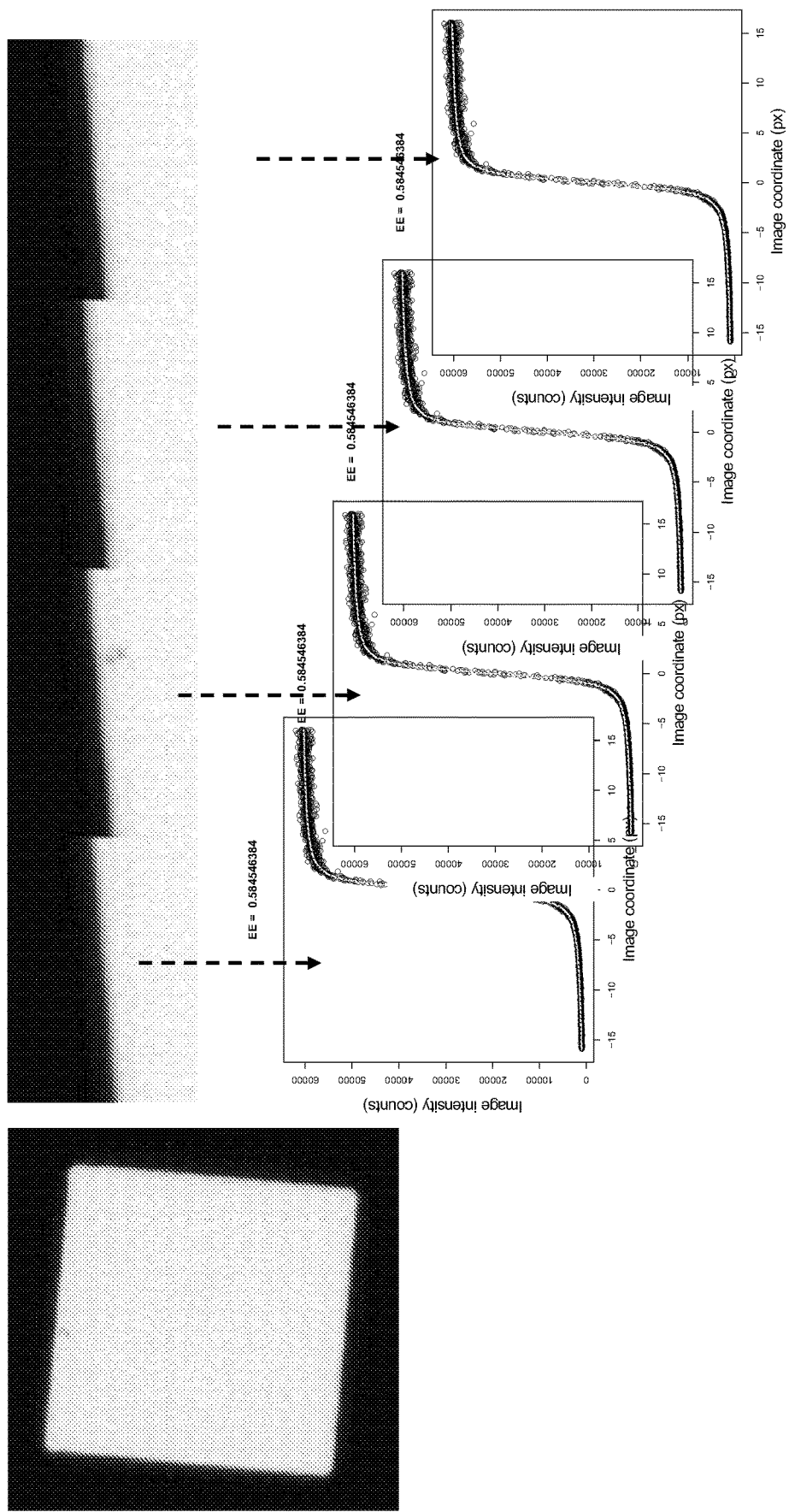
FIG. 10 is an example of calculating ESFs for the four edges of the target feature 313, fitting the ESFs to the linear combination of error functions, and calculating four independent EE values from the corresponding fits.

FIG. 10 is an example of calculating ESFs for the four edges of the target feature 313, fitting the ESFs to the error function, and calculating four independent EE values from the corresponding ESFs. Nominally, the left and right edges should result in the same measurement ($EE_{left}=EE_{right}$), and the upper and lower edges should result in the same measurement ($EE_{up}=EE_{down}$). However, the measurements for the left and right edges are not necessarily the same as the measurements for the upper and lower edges.

In an alternative embodiment, Encircled Energy may be utilized as the imaging performance metric instead of Ensquared Energy. In a further alternative embodiment, the Strehl ratio may be utilized as the imaging performance metric instead of Ensquared Energy.

Figure 11:
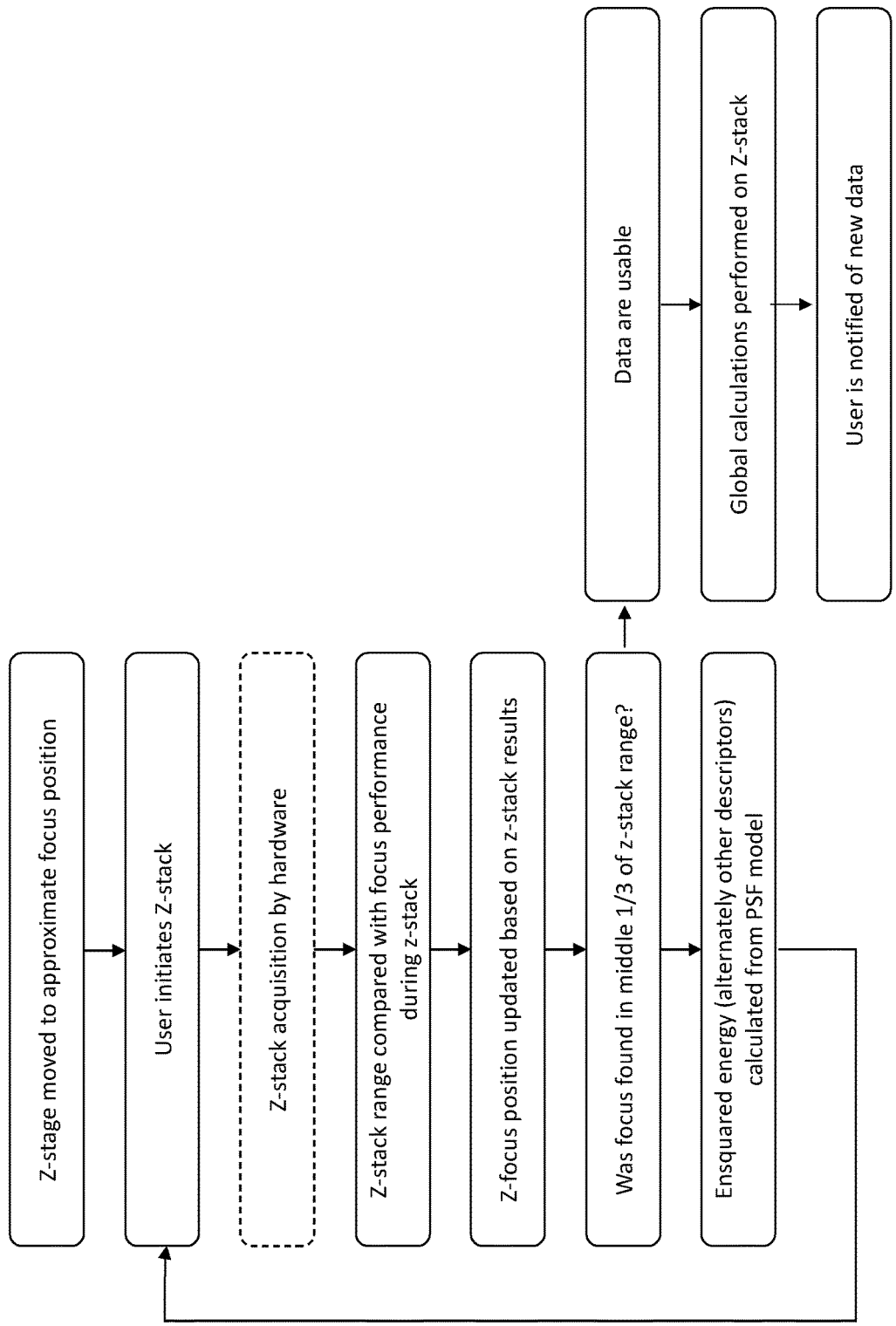
FIG. 11 is a flow diagram illustrating an example of a method for testing the imaging performance of an optical system according to an embodiment of the present disclosure.

FIG. 11 is a flow diagram 1100 illustrating an example of a method for testing the imaging performance of an optical system, such as the optical system 104 described herein, according to an embodiment of the present disclosure. As illustrated, the method is initiated by moving the Z-stage of the objective to an approximate focus position. The user then initiates the process of Z-stack acquisition, by which a plurality of images of the test target are acquired at different focal positions. The hardware of the optical system then performs the Z-stack acquisition, an embodiment of which is further illustrated in FIG. 12. The Z-stack range is then compared with the focus performance during the Z-stack acquisition. The Z-focus position is then updated based on the Z-stack results. A determination is then made as to whether the focus was found in the middle one-third of the Z-stack range. If yes, then the method determines that the data currently acquired are usable, global calculations are performed on the Z-stack, and the user is notified of the new data so generated.

On the other hand, if it is determined that the focus was not found in the middle one-third of the Z-stack range, calculations of imaging performance values (e.g., Ensquared Energy estimates as described herein) are made from the data currently acquired but the user is warned that the data are incomplete or not reliable as focus was not found in the middle of the range. The process of Z-stack acquisition may then be repeated with a more informed guess of the focal position obtained from this z-stack.

Figure 12:
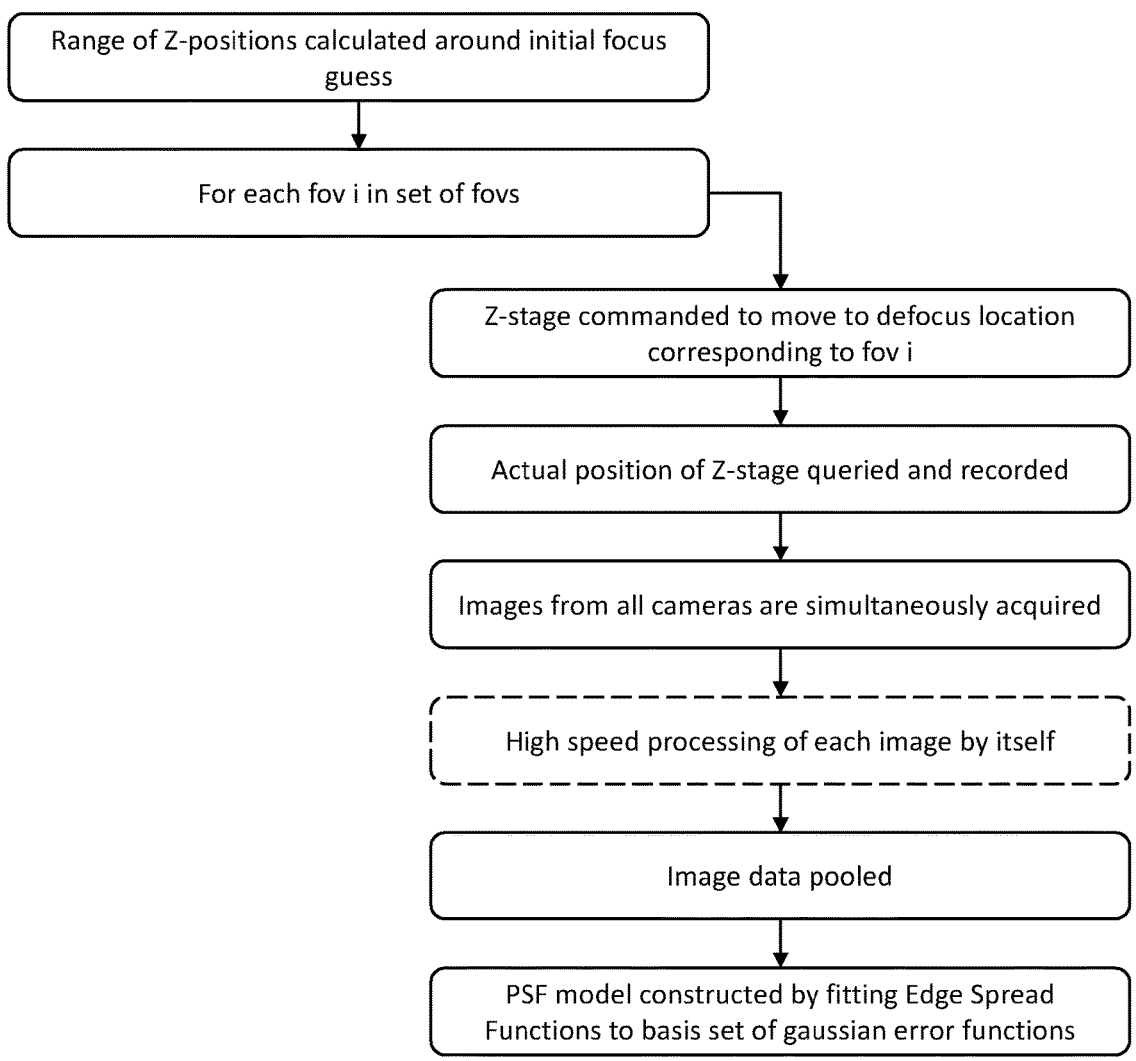
FIG. 12 is a flow diagram illustrating the acquisition of a Z-stack of images according to an embodiment of the present disclosure.

FIG. 12 is a flow diagram 1200 illustrating the acquisition of a Z-stack of images according to an embodiment of the present disclosure. After the user initiates the Z-stack acquisition (FIG. 11), a range of Z-positions is calculated around the initial focus guess. For each field of view, FOV i, in the set of FOVs, the Z-stage is commanded to move to the defocus position corresponding to FOV i. The actual position of the Z-stage is then queried and recorded. Images from all imaging devices are then simultaneously acquired. High-speed processing of each image by itself is then performed, an embodiment of which is further illustrated in FIG. 13. The image data are then pooled. A plurality of PSF models, one per ESF, are then constructed by fitting ESFs to a basis set of Gaussian error functions, as described herein.

Figure 13:
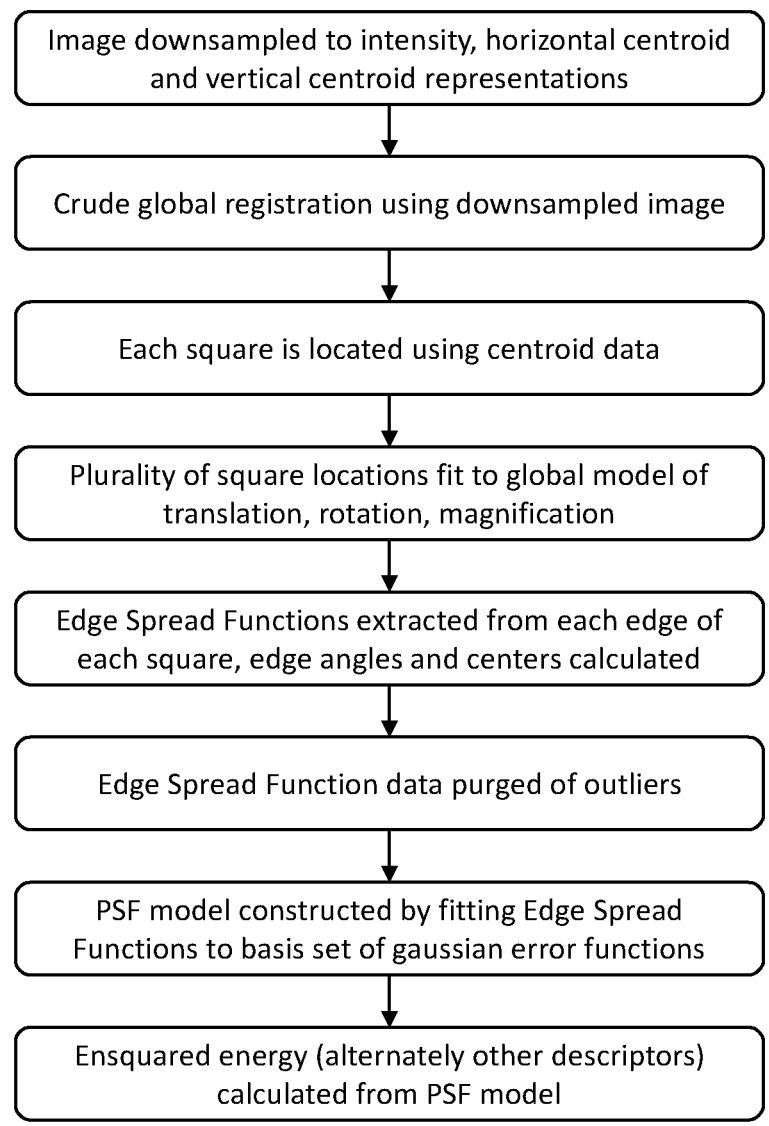
FIG. 13 is a flow diagram illustrating the processing of an individual image according to an embodiment of the present disclosure.

FIG. 13 is a flow diagram 1300 illustrating the high-speed processing of an image by itself according to an embodiment of the present disclosure. The image is down-sampled to representations of intensity, horizontal centroid, and vertical centroid. A crude global registration is then performed using the down-sampled image. Each square (or other type of target feature of the test target) is located using the centroid data. A plurality of square locations are then fitted to a global model of translation, rotation, and magnification. ESFs are then extracted from each edge of each square, and edge angles and centers are calculated. The ESF data are then purged of outliers. A plurality of PSF models are then constructed by independently fitting each ESF to a basis set of Gaussian error functions, as described herein. Imaging performance values (e.g., Ensquared Energy estimates as described herein) are then calculated for each ESF. Data may be averaged ($EE_{horizontal}=(EE_{left}=EE_{right})/2$, $EE_{vertical}=(EE_{up}=EE_{down})/2$) The process illustrated in FIG. 13 may be repeated on a plurality of images, and the resulting image data may be pooled (FIG. 12) and further processed.

In an embodiment, one or more of the flow diagrams 1100, 1200, and 1300 may represent an optical imaging performance testing system, or part of an optical imaging performance testing system, configured to carry out (e.g., control or perform) the steps or functions described above and illustrated in one or more of FIGS. 11, 12, and 13. For this purpose, a controller (e.g., the controller 108 shown in FIG. 1) including a processor, memory, and other components as appreciated by persons skilled in the art, may be provided to control the performance of the steps or functions, such as by controlling the components of the testing system involved in carrying out the steps or functions. This may involve receiving and processing user input and/or machine-executable instructions, as appreciated by persons skilled in the art.

Figure 14:
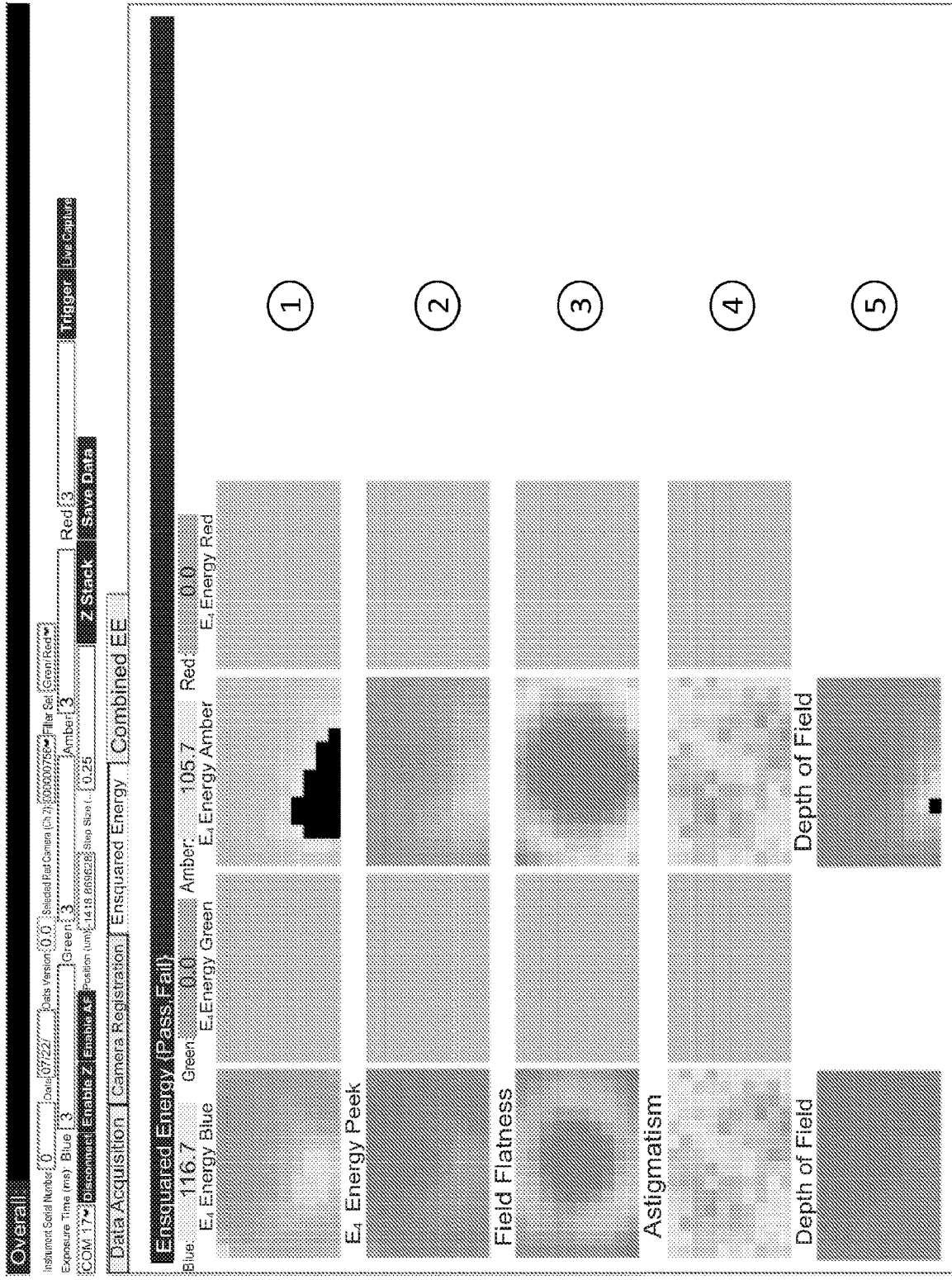
FIG. 14 illustrates an example of a set of EE performance maps that may be generated according to the method, according to an embodiment of the present disclosure.

FIG. 14 illustrates an example of a set of EE performance maps that may be generated according to the method, and as may be displayed to the user on a display screen of a computing device (e.g., computing device 168). The columns of maps correspond to different colors, which in the present example are, from left to right, blue, green, amber, and red. In the uppermost row (row 1), each map displays the average EE for each point in the field of view (FOV). In the next row (row 2), each map displays the best EE found at any defocus value for each point in the FOV. In the next row (row 3), each map displays the surface of best focus as determined by EE. In the next row (row 4), each map displays the astigmatism of horizontal versus vertical imaging data as determined by EE. In the bottommost row (row 5), each map displays the depth of field as a z-range over which EE exceeds a minimum value.

Figure 15:
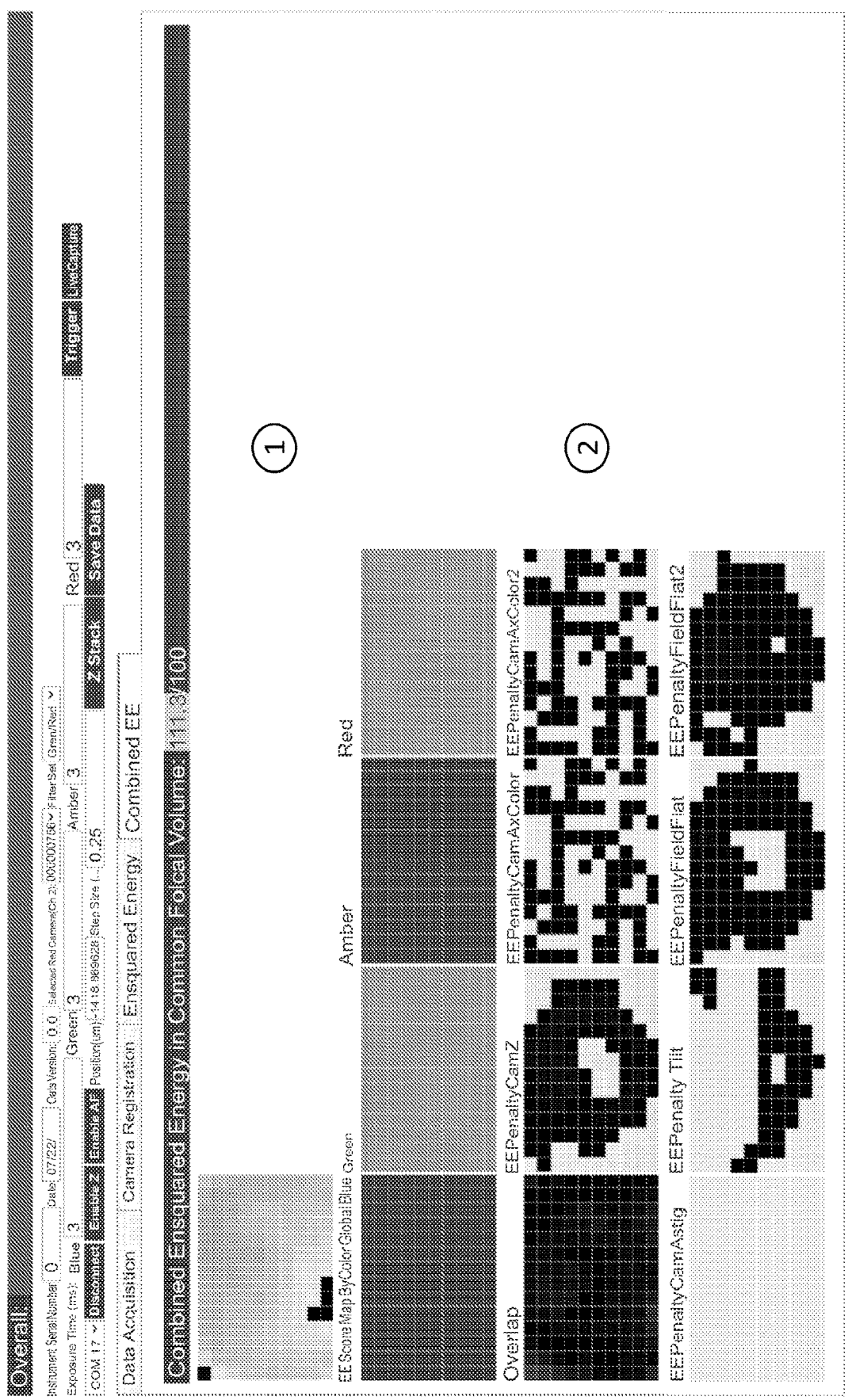
FIG. 15 illustrates an example of combined EE scores and performance maps that may be generated according to the method, according to an embodiment of the present disclosure.

FIG. 15 illustrates an example of combined EE scores and performance maps that may be generated according to the method, and as may be displayed to the user on a display screen of a computing device (e.g., computing device 168). The uppermost map (1) is a global EE map showing the usable EE over all channels and defocus positions. Below the uppermost map (1), the group of maps (2) show the contribution of various optical imperfections such as those described above. As such, these maps (2) inform the user as to how much better imaging performance would be if the user were to have addressed the defect in question. In the present example, the first row of the group of maps (2) show global scores for different colors, which in the present example are, from left to right, blue, green, amber, and red. The second row of the group of maps (2) show, from left to right, overlap, the penalty to EE from imaging device Z shift, the penalty to EE from axial chromatic aberrations in channel 1, and the penalty to EE from axial chromatic aberrations in channel 2. The third row of the group of maps (2) show, from left to right, the penalty to EE from astigmatism, the penalty to EE from imaging device tilt, the penalty to EE from field flatness in channel 1, and the penalty to EE from field flatness in channel 2.

Figure 16:
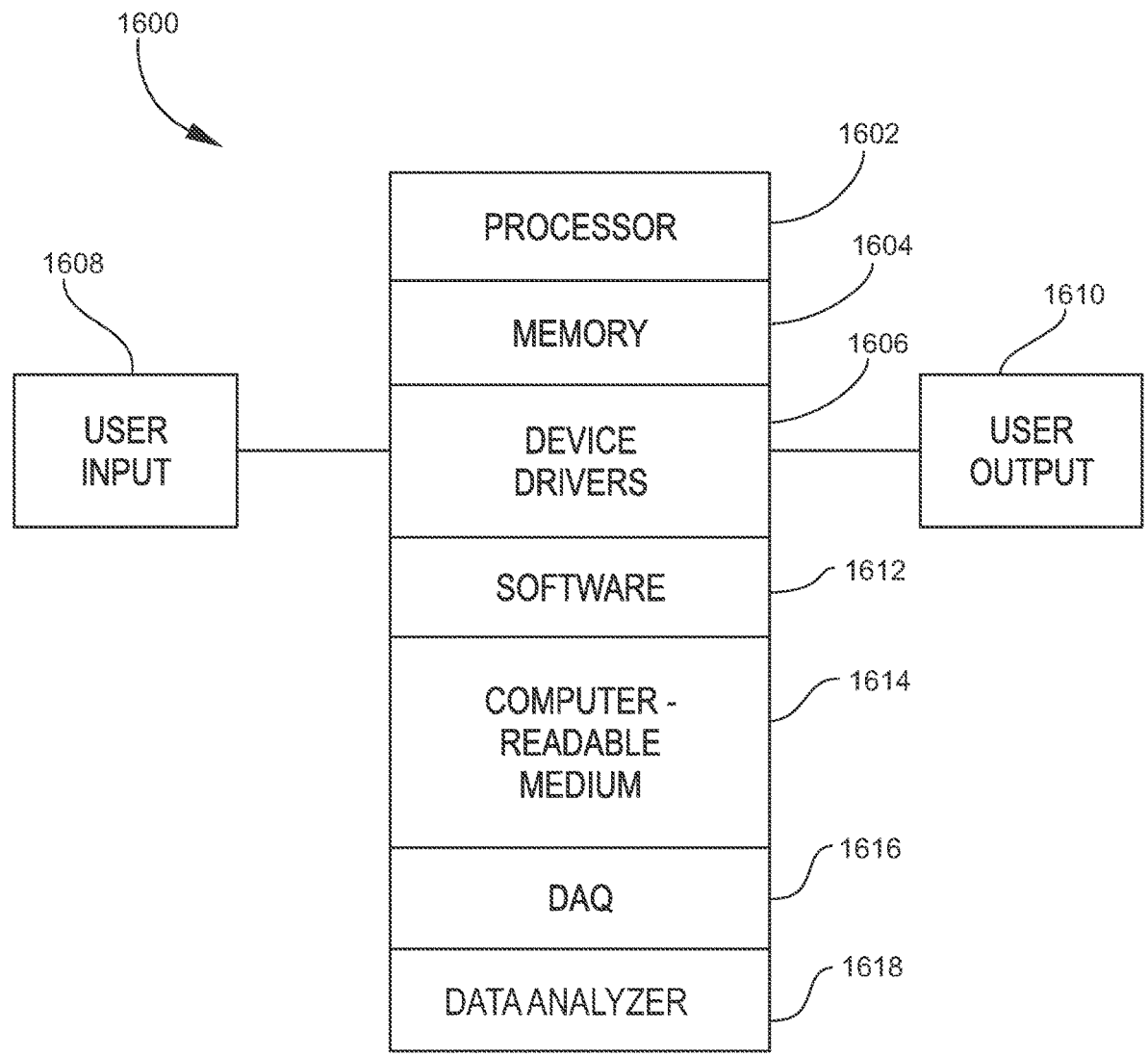
FIG. 16 is a schematic view of a non-limiting example of a system controller (or controller) that may be part of or communicate with an optical imaging performance testing system according to an embodiment of the present disclosure such as the system illustrated in FIG. 1.

FIG. 16 is a schematic view of a non-limiting example of a system controller (or controller) 1600 that may be part of or communicate with an optical imaging performance testing system according to an embodiment of the present disclosure. For example, the system controller 1600 may correspond to the system controller 108 of the testing system 100 described above and illustrated in FIG. 1.

In the illustrated embodiment, the system controller 1600 includes a processor 1602 (typically electronics-based), which may be representative of a main electronic processor providing overall control, and one or more electronic processors configured for dedicated control operations or specific signal processing tasks (e.g., a graphics processing unit or GPU, a digital signal processor or DSP, an application-specific integrated circuit or ASIC, a field-programmable gate array or FPGA, etc.). The system controller 1600 also includes one or more memories 1604 (volatile and/or non-volatile) for storing data and/or software. The system controller 1600 may also include one or more device drivers 1606 for controlling one or more types of user interface devices and providing an interface between the user interface devices and components of the system controller 1600 communicating with the user interface devices. Such user interface devices may include user input devices 1608 (e.g., keyboard, keypad, touch screen, mouse, joystick, trackball, and the like) and user output devices 1610 (e.g., display screen, printer, visual indicators or alerts, audible indicators or alerts, and the like). In various embodiments, the system controller 1600 may be considered as including one or more of the user input devices 1608 and/or user output devices 1610, or at least as communicating with them. The system controller 1600 may also include one or more types of computer programs or software 1612 contained in memory and/or on one or more types of computer-readable media 1614. The computer programs or software may contain non-transitory instructions (e.g., logic instructions) for controlling or performing various operations of the testing system 100. The computer programs or software may include application software and system software. System software may include an operating system (e.g., a Microsoft Windows® operating system) for controlling and managing various functions of the system controller 1600, including interaction between hardware and application software. In particular, the operating system may provide a graphical user interface (GUI) displayable via a user output device 1610, and with which a user may interact with the use of a user input device 1608.

The system controller 1600 may also include one or more data acquisition/signal conditioning components (DAQ) 1616 (as may be embodied in hardware, firmware and/or software) for receiving and processing signals (e.g., imaging data) outputted by the optical system under test (e.g., the optical system 104 described above and illustrated in FIG. 1), including formatting data for presentation in graphical form by the GUI. The DAQ 1616 may also be configured to transmit control signals to the optical system to control movement/positioning of the adjustable optical components, such as those described herein. The DAQ 1616 may correspond to all or part of the electronics module 164 described above and illustrated in FIG. 1.

The system controller 1700 may further include a data analyzer (or module) 1618 configured to process signals outputted from the optical system and produce data therefrom, including imaging performance metrics, scores, maps, or the like, as described throughout the present disclosure. Thus, the data analyzer 1618 may be configured to implement (control or perform) all or part of any of the methods disclosed herein. For these purposes, the data analyzer 1618 may be embodied in software and/or electronics (hardware and/or firmware) as appreciated by persons skilled in the art. The data analyzer 1618 may correspond to all or part of the electronics module 164 and/or computing device 168 described above and illustrated in FIG. 1.

It will be understood that FIG. 16 is high-level schematic depiction of an example of a system controller 1600 consistent with the present disclosure. Other components, such as additional structures, devices, electronics, and computer-related or electronic processor-related components may be included as needed for practical implementations. It will also be understood that the system controller 1600 is schematically represented in FIG. 16 as functional blocks intended to represent structures (e.g., circuitries, mechanisms, hardware, firmware, software, etc.) that may be provided. The various functional blocks and any signal links between them have been arbitrarily located for purposes of illustration only and are not limiting in any manner Persons skilled in the art will appreciate that, in practice, the functions of the system controller 1600 may be implemented in a variety of ways and not necessarily in the exact manner illustrated in FIG. 16 and described by example herein.

Exemplary Embodiments

Exemplary embodiments provided in accordance with the presently disclosed subject matter include, but are not limited to, the following:

1. A method for testing imaging performance of an optical system, the method comprising: positioning a test target at an object plane of the optical system; operating the optical system to illuminate the test target and generate an image beam; operating a focusing stage of the optical system to acquire a plurality of images of the test target from the image beam corresponding to a plurality of values of defocus; calculating from each image a plurality of Edge Spread Functions at a plurality of locations within the test target; constructing a plurality of Point Spread Function models from the respective Edge Spread Functions; and based on the Point Spread Function models, calculating a plurality of imaging performance values corresponding to the plurality of locations, wherein the imaging performance values are based on a metric selected from the group consisting of: Ensquared Energy; Encircled Energy; and Strehl ratio.
2. The method of embodiment 1, wherein the plurality of locations comprises a plurality of field coordinates (x, y) in the object plane within the test target.
3. The method of any of the preceding embodiments, wherein the plurality of locations comprises a plurality of focal positions (z) along an optical axis passing through the test target, and operating the optical system comprises acquiring a plurality of images of the test target at different focal positions (z).
4. The method of any of the preceding embodiments, comprising producing one or more maps of imaging performance based on a combination of the imaging performance values.
5. The method of embodiment 4, comprising comparing two or more of the maps to provide a measure of relative alignment of a focal plane of each imaging device or channel relative to the object plane.
6. The method of embodiment 4 or 5, wherein the one or more maps correspond to different imaging channels, and the different imaging channels correspond to different imaging devices of the optical system operated to acquire the image, or different wavelengths of the image acquired, or both different imaging devices and different colors.
7. The method of embodiment 6, comprising comparing two or more of the maps to provide a measure of relative alignment of each imaging device or channel relative to each other; and both of the foregoing.
8. The method of any of embodiments 4-7, comprising, after producing the one or more maps, adjusting a position of one or more optical components of the optical system, or replacing the one or more optical components, based on information provided by the one or more maps.
9. The method of embodiment 8, wherein the one or more optical components are selected from the group consisting of: one or more of the imaging devices; an objective of the optical system; one or more tube lenses of the optical system; one or more mirrors or dichroic mirrors; and a combination of two or more of the foregoing.
10. The method of embodiment 8 or 9, wherein the one or more maps are one or more initial maps, and further comprising, after adjusting or replacing the one or more optical components, acquiring a new image of the test target, calculating a plurality of new imaging performance values, and producing one or more new maps of imaging performance.
11. The method of embodiment 10, comprising comparing the one or more new maps to the one or more initial maps to determine position adjustments to be made to the one or more optical components for optimizing imaging performance.
12. The method of any of embodiments 8-11, wherein the adjusting or replacing finds an optimum pair of conjugate image planes in the optical system.
13. The method of any of embodiments 8-12, wherein the adjusting or replacing improves an attribute selected from the group consisting of: focus matching of the imaging devices; imaging device tilt; flattening of field curvature; reduction of astigmatism; reduction of wavelength-dependent focus shift; and a combination of two or more of the foregoing.
14. The method of any of the preceding embodiments, comprising calculating one or more global scores of imaging performance based on a combination of the imaging performance values.
15. The method of embodiment 14, comprising modifying the one or more global scores to penalize or reward heterogeneity of the imaging performance values over a range of field coordinates (x, y) in the object plane within the test target, or through a range of focal positions (z) of the object plane, or both of the foregoing.
16. The method of embodiment 14 or 15, comprising modifying the one or more global scores to penalize or reward similarity of different imaging channels as a function of field coordinates (x, y) in the object plane within the test target, or focal position (z) of the object plane, or both of the foregoing, wherein the different imaging channels correspond to different imaging devices of the optical system operated to acquire the image, or different wavelengths of the image acquired, or both different imaging devices and different colors.
17. The method of any of the preceding embodiments, comprising, after calculating the imaging performance values, adjusting a position of one or more optical components of the optical system based on information provided by the imaging performance values.
18. The method of embodiment 17, wherein the imaging performance values are initial imaging performance values, and further comprising, after adjusting the one or more optical components, acquiring a new image of the test target, and calculating a plurality of new imaging performance values.
19. The method of embodiment 18, comprising comparing the new imaging performance values to the initial imaging performance values to determine position adjustments to be made to the one or more optical components for optimizing imaging performance.
20. The method of any of the preceding embodiments, wherein positioning the test target comprises aligning the target relative to a datum shared with one or more optical components of the optical system.

21. The method of any of the preceding embodiments, wherein operating the optical system comprises utilizing an objective in the image beam, and further comprising adjusting a position of the objective along an axis of the image beam to acquire a plurality of images of the test target at different focal positions (z).

22. The method of embodiment 21, wherein the objective has a configuration selected from the group consisting of: the objective is configured for infinite conjugate microscopy; and the objective is configured for finite conjugate microscopy.

23. The method of any of the preceding embodiments, wherein operating the optical system comprises operating two or more imaging devices to acquire respective images of the test target.

24. The method of embodiment 23, wherein the two or more imaging devices acquire the respective images at two or more different wavelengths.

25. The method of embodiment 24, comprising splitting an image beam propagating from the test target into two or more image beam portions, and transmitting the two or more image beam portions to the two or more imaging devices, respectively.

26. The method of any of the preceding embodiments, wherein operating the optical system comprises operating a filter assembly to filter the image beam at a selected wavelength.

27. The method of any of the preceding embodiments, wherein operating the optical system comprises utilizing a tube lens in the image beam, and further comprising adjusting a relative position of one or more lenses or lens groups within the tube lens to acquire a plurality of images of the test target at different positions of the tube lens.

28. The method of any of the preceding embodiments, wherein the test target comprises a dark material and an array of bright features disposed on the dark material.

29. The method of embodiment 28, wherein the bright features are polygonal.

30. The method of embodiment 29, wherein the bright features are tilted such that edges of the bright features are oriented at angles to a pixel array of the optical imaging system that acquires the image.

31. An optical imaging performance testing system, comprising: a target holder configured to hold a test target; a light source configured to illuminate the test target; an imaging device configured to acquire images of the test target; an objective positioned in an imaging light path between the test target and the imaging device, wherein a position of at least one of the objective or the target holder is adjustable along the imaging light path; and a controller comprising an electronic processor and a memory, and configured to control the steps of the method of any of the preceding embodiments of calculating the plurality of Edge Spread Functions, constructing the plurality of Point Spread Function models, and calculating the plurality of imaging performance values.

32. The system of embodiment 31, wherein the objective has a configuration selected from the group consisting of: the objective is configured for infinite conjugate microscopy; and the objective is configured for finite conjugate microscopy.

33. The system of embodiment 31 or 32, wherein the imaging device comprises a plurality of imaging devices, and further comprising an image separation mirror configured to split the imaging light path into a plurality of imaging light paths respectively directed to the imaging devices.

34. The system of any of embodiments 31-33, comprising a filter assembly configured to select a wavelength of an image beam in the imaging light path for propagation to the imaging device.

35. The system of any of embodiments 31-34, comprising a tube lens positioned in the imaging light path, wherein the relative position of one or more lenses or lens groups within the tube lens is adjustable.

36. The system of any of embodiments 31-35, comprising the test target, wherein the test target comprises a dark material and an array of bright features disposed on the dark material.

37. The system of embodiment 36, wherein the bright features are polygonal.

38. The system of embodiment 37, wherein the bright features are tilted such that edges of the bright features are oriented at angles to a pixel array of the optical imaging system that acquires the image.

39. A non-transitory computer-readable medium, comprising instructions stored thereon, that when executed on a processor, perform the steps of the method of any of the preceding embodiments of calculating the plurality of Edge Spread Functions, constructing the plurality of Point Spread Function models, and calculating the plurality of imaging performance values.

40. A system for testing imaging performance of an optical system, comprising the computer-readable storage medium of embodiment 39.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the controller 108 or 1600 schematically depicted in FIG. 1 or 16. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), field-programmable gate arrays (FPGAs), or application specific integrated circuits (ASICs). Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the controller 108 or 1600 in FIG. 1 or 16), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for testing imaging performance of an optical system, the method comprising:
    positioning a test target at an object plane of the optical system;
    operating the optical system to illuminate the test target and generate an image beam;
    operating a focusing stage of the optical system to acquire a plurality of images of the test target from the image beam corresponding to a plurality of values of defocus;
    calculating from each image a plurality of Edge Spread Functions at a plurality of locations within the test target;
    constructing a plurality of Point Spread Function models from the respective Edge Spread Functions;
    based on the Point Spread Function models, calculating a plurality of imaging performance values corresponding to the plurality of locations, wherein the imaging performance values are based on a metric selected from the group consisting of: Ensquared Energy; Encircled Energy; and Strehl ratio;
    producing one or more maps of imaging performance based on a combination of the imaging performance values; and
    comparing two or more of the maps to provide at least one of:
        a measure of relative alignment of a focal plane of each imaging device relative to the object plane;
        a measure of relative alignment of each imaging device relative to each other.

2. The method of claim 1, comprising at least one of:
    (a) wherein the plurality of locations comprises a plurality of field coordinates (x, y) in the object plane within the test target;
    (b) wherein the plurality of locations comprises a plurality of focal positions (z) along an optical axis passing through the test target, and operating the optical system comprises acquiring a plurality of images of the test target at different focal positions (z).

3. The method of claim 1, wherein the one or more maps correspond to different imaging channels, and the different imaging channels correspond to different imaging devices of the optical system operated to acquire the image, or different wavelengths of the image acquired, or both different imaging devices and different colors.

4. The method of claim 1, comprising, after producing the one or more maps, adjusting a position of one or more optical components of the optical system, or replacing the one or more optical components, based on information provided by the one or more maps.

5. The method of claim 4, wherein the one or more optical components are selected from the group consisting of: one or more of the imaging devices; an objective of the optical system; one or more tube lenses of the optical system; one or more mirrors or dichroic mirrors of the optical system; and a combination of two or more of the foregoing.

6. The method of claim 4, wherein the one or more maps are one or more initial maps, and further comprising, after adjusting or replacing the one or more optical components, acquiring a new image of the test target, calculating a plurality of new imaging performance values, and producing one or more new maps of imaging performance.

7. The method of claim 6, comprising comparing the one or more new maps to the one or more initial maps to determine position adjustments to be made to or replacements to be made of the one or more optical components for optimizing imaging performance.

8. The method of claim 4, comprising at least one of:
    (a) wherein the adjusting or replacing finds an optimum pair of conjugate image planes in the optical system;
    (b) wherein the adjusting or replacing improves an attribute selected from the group consisting of: focus matching of the imaging devices; imaging device tilt; flattening of field curvature; reduction of astigmatism;

reduction of wavelength-dependent focus shift; and a combination of two or more of the foregoing.

9. The method of claim 1, comprising calculating one or more global scores of imaging performance based on a combination of the imaging performance values.

10. The method of claim 9, comprising at least one of:
(a) modifying the one or more global scores to penalize or reward heterogeneity of the imaging performance values over a range of field coordinates (x, y) in the object plane within the test target, or through a range of focal positions (z) of the object plane, or both of the foregoing;
(b) modifying the one or more global scores to penalize or reward similarity of different imaging channels as a function of field coordinates (x, y) in the object plane within the test target, or focal position (z) of the object plane, or both of the foregoing, wherein the different imaging channels correspond to different imaging devices of the optical system operated to acquire the image, or different wavelengths of the image acquired, or both different imaging devices and different colors.

11. The method of claim 1, comprising, after calculating the imaging performance values, adjusting a position of one or more optical components of the optical system based on information provided by the imaging performance values.

12. The method of claim 11, wherein the imaging performance values are initial imaging performance values, and further comprising, after adjusting the one or more optical components, acquiring a new image of the test target, and calculating a plurality of new imaging performance values.

13. The method of claim 12, comprising comparing the new imaging performance values to the initial imaging performance values to determine position adjustments to be made to the one or more optical components for optimizing imaging performance.

14. The method of claim 1, comprising at least one of:
(a) wherein positioning the test target comprises aligning the target relative to a datum shared with one or more optical components of the optical system;
(b) wherein operating the optical system comprises utilizing an objective in the image beam, and further comprising adjusting a position of the objective along an axis of the image beam to acquire a plurality of images of the test target at different focal positions (z);
(c) wherein operating the optical system comprises utilizing an objective in the image beam, and further comprising adjusting a position of the objective along an axis of the image beam to acquire a plurality of images of the test target at different focal positions (z), wherein the objective has a configuration selected from the group consisting of: the objective is configured for infinite conjugate microscopy; and the objective is configured for finite conjugate microscopy;
(d) wherein operating the optical system comprises operating two or more imaging devices to acquire respective images of the test target;
(e) wherein operating the optical system comprises operating two or more imaging devices to acquire respective images of the test target, wherein the two or more imaging devices acquire the respective images at two or more different wavelengths;
(f) wherein operating the optical system comprises operating two or more imaging devices to acquire respective images of the test target, wherein the two or more imaging devices acquire the respective images at two or more different wavelengths, and further comprising splitting an image beam propagating from the test target into two or more image beam portions, and transmitting the two or more image beam portions to the two or more imaging devices, respectively;
(g) wherein operating the optical system comprises operating a filter assembly to filter the image beam at a selected wavelength;
(h) wherein operating the optical system comprises utilizing a tube lens in the image beam, and further comprising adjusting a relative position of one or more lenses or lens groups within the tube lens to acquire a plurality of images of the test target at different positions of the tube lens;
(i) wherein the test target comprises a dark material and an array of bright features disposed on the dark material;
(j) wherein the test target comprises a dark material and an array of bright features disposed on the dark material, and the bright features are polygonal;
(k) wherein the test target comprises a dark material and an array of bright features disposed on the dark material, the bright features are polygonal, and the bright features are tilted such that edges of the bright features are oriented at angles to a pixel array of the optical imaging system that acquires the image.

15. An optical imaging performance testing system, comprising:
a target holder configured to hold a test target;
a light source configured to illuminate the test target;
an imaging device configured to acquire images of the test target;
an objective positioned in an imaging light path between the test target and the imaging device, wherein a position of at least one of the objective or the target holder is adjustable along the imaging light path; and
a controller comprising an electronic processor and a memory, and configured to control the steps of the method of claim 1 of calculating the plurality of Edge Spread Functions, constructing the plurality of Point Spread Function models, calculating the plurality of imaging performance values, producing one or more maps of imaging performance, and comparing two or more of the maps.

16. The system of claim 15, comprising at least one of:
(a) wherein the objective has a configuration selected from the group consisting of: the objective is configured for infinite conjugate microscopy; and the objective is configured for finite conjugate microscopy;
(b) wherein the imaging device comprises a plurality of imaging devices, and further comprises an image separation mirror configured to split the imaging light path into a plurality of imaging light paths respectively directed to the imaging devices;
(c) a filter assembly configured to select a wavelength of an image beam in the imaging light path for propagation to the imaging device;
(d) a tube lens positioned in the imaging light path, wherein the relative position of one or more lenses or lens groups within the tube lens is adjustable;
(e) the test target, wherein the test target comprises a dark material and an array of bright features disposed on the dark material;
(f) the test target, wherein the test target comprises a dark material and an array of bright features disposed on the dark material, and the bright features are polygonal;
(g) the test target, wherein the test target comprises a dark material and an array of bright features disposed on the dark material, the bright features are polygonal, and the bright features are tilted such that edges of the bright features are oriented at angles to a pixel array of the optical imaging system that acquires the image.

17. A non-transitory computer-readable medium, comprising instructions stored thereon, that when executed on a processor, perform the steps of the method of claim 1 of calculating the plurality of Edge Spread Functions, constructing the plurality of Point Spread Function models, calculating the plurality of imaging performance values, producing one or more maps of imaging performance, and comparing two or more of the maps.

* * * * *